(12) United States Patent
Nagasaki et al.

(10) Patent No.: US 8,501,306 B2
(45) Date of Patent: Aug. 6, 2013

(54) VISCOELASTIC ARTICLES WITH POLYMER LAYER CONTAINING ELASTOMER UNEVENLY DISTRIBUTED

(75) Inventors: Kunio Nagasaki, Ibaraki (JP); Yusuke Sugino, Ibaraki (JP); Kohei Doi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 439 days.

(21) Appl. No.: 12/734,823

(22) PCT Filed: Nov. 11, 2008

(86) PCT No.: PCT/JP2008/070832
§ 371 (c)(1),
(2), (4) Date: May 26, 2010

(87) PCT Pub. No.: WO2009/069485
PCT Pub. Date: Jun. 4, 2009

(65) Prior Publication Data
US 2010/0304104 A1 Dec. 2, 2010

(30) Foreign Application Priority Data
Nov. 30, 2007 (JP) ................................. 2007-309987

(51) Int. Cl.
B32B 7/02 (2006.01)
B32B 7/12 (2006.01)
C08F 2/46 (2006.01)
B05D 5/10 (2006.01)

(52) U.S. Cl.
USPC ........... 428/213; 428/492; 428/494; 428/343; 427/487; 427/207.1; 427/256

(58) Field of Classification Search
None
See application file for complete search history.

(56) References Cited

U.S. PATENT DOCUMENTS
4,181,752 A 1/1980 Martens et al.
2003/0091818 A1* 5/2003 Banba et al. .................. 428/343

FOREIGN PATENT DOCUMENTS
| EP | 0349216 A1 | 1/1990 |
| EP | 0352901 A1 | 1/1990 |
| JP | 02-045580 A | 2/1990 |
| JP | 02-047182 A | 2/1990 |
| JP | 2002-363389 A | 12/2002 |
| JP | 2005-264047 A | 9/2005 |
| JP | 2006-307209 A | 11/2006 |

OTHER PUBLICATIONS
International Search Report dated Mar. 10, 2009, issued on PCT/JP2008/070832.

* cited by examiner

Primary Examiner — David Sample
Assistant Examiner — Nicole T Gugliotta
(74) Attorney, Agent, or Firm — Edwards Wildman Palmer LLP; James E. Armstrong, IV

(57) ABSTRACT

Provided is a viscoelastic article which exerts different properties between one surface and the other surface thereof, which has a transparent appearance, and which less causes staining of objects to which the viscoelastic article is adopted. The viscoelastic article is an article having a multilayer structure including a polymer layer, and a monomer-absorptive layer capable of absorbing at least one of monomer component(s) constituting the polymer, in which the polymer layer is a polymer layer containing an elastomer unevenly distributed and enriched at an interface, or in the vicinity thereof, opposite to the monomer-absorptive layer. The vicinity of the interface opposite to the monomer-absorptive layer is preferably a region ranging from the interface opposite to the other interface with the monomer-absorptive layer and occupying, in a thickness direction, 50% or less of the total thickness.

10 Claims, 4 Drawing Sheets

VISCOELASTIC ARTICLES WITH POLYMER LAYER CONTAINING ELASTOMER UNEVENLY DISTRIBUTED

TECHNICAL FIELD

The present invention relates to viscoelastic articles each having a polymer layer containing an elastomer unevenly distributed, and to processes for producing the viscoelastic articles.

BACKGROUND ART

Rubber polymers and acrylic polymers as viscoelastic materials are widely adopted typically to sheets and films, or to pressure-sensitive adhesives and cushioning materials.

When adopted to pressure-sensitive adhesives, rubber pressure-sensitive adhesives are prepared by incorporating various additives such as tackifiers to elastomer materials such as natural rubbers or synthetic rubbers. Such rubber pressure-sensitive adhesives are relatively not so selective with respect to adherends and thereby exert satisfactory adhesiveness even when applied to nonpolar plastics (e.g., polyolefinic resins such as polypropylenes and polyethylenes) to which acrylic pressure-sensitive adhesives may not exhibit adhesiveness. In contrast, the acrylic pressure-sensitive adhesives are superior in adhesiveness to adherends having relatively high polarity, such as metals, as compared to rubber polymers and, in addition, are more advantageous typically in transparency, durability, and thermal stability than the rubber pressure-sensitive adhesives.

As is described above, either of the rubber pressure-sensitive adhesives and acrylic pressure-sensitive adhesives have both advantages and disadvantages, and these pressure-sensitive adhesives are used depending on the purpose or intended use. Exemplary uses of pressure-sensitive adhesives include a pressure-sensitive adhesive tape or sheet (hereinafter such a "tape or sheet" is also simply referred to as a "tape" or "sheet"); and a label. When a double-sided pressure-sensitive adhesive tape, for example, is adopted to joining of two or more articles with each other, demands are often made to join articles (adherends) made from different materials with each other through the pressure-sensitive adhesive. In these cases, it is not rare that one of the adherends is made from a nonpolar material such as a polyolefin, and the other adherend is made from a polar material such as a metal. In this case, neither rubber pressure-sensitive adhesives nor acrylic pressure-sensitive adhesives can provide satisfactory joining between the two adherends of different types through the pressure-sensitive adhesive.

To solve these problems, demands have been made to provide pressure-sensitive adhesives having both advantages of rubber pressure-sensitive adhesives and advantages of acrylic pressure-sensitive adhesives. Typically, there are known pressure-sensitive adhesives as blends of a rubber viscoelastic material and an acrylic polymer (see Patent Document 1 and Patent Document 2). The use of such blended pressure-sensitive adhesives improves the adhesiveness to adherends which are hard to adhere through acrylic pressure-sensitive adhesives. These blended pressure-sensitive adhesives, however, have a microphase separation structure because of poor miscibility between the rubber viscoelastic material and the acrylic polymer, and the microphase separation structure may cause insufficient transparency and staining of the adherend and may vary the performance of the adhesives when the adhesives are stored for a long duration from the production.

Another possible solution is a technique of preparing a film of a rubber pressure-sensitive adhesive and a film of an acrylic pressure-sensitive adhesive; and affixing the two films with each other. This technique, however, requires a complicated process to produce the pressure-sensitive adhesive, because the technique needs the steps of forming a film of rubber pressure-sensitive adhesive according to a procedure, forming a film of acrylic pressure-sensitive adhesive according to another procedure, and affixing the two films. Independently, there are demands based on recent environmental issues to reduce organic solvents and to prevent global warming due to carbon dioxide ($CO_2$). However, filming of an acrylic pressure-sensitive adhesive and a rubber pressure-sensitive adhesive, if to be performed without using solvents so as to meet the above demands, needs two filming processes of different types. Specifically, an acrylic pressure-sensitive adhesive can be filmed substantially without using any solvent and without the need of a drying step when a polymerization process by the action of ultraviolet rays (UV polymerization process) as disclosed typically in Patent Document 3 is adopted; but a rubber pressure-sensitive adhesive is difficult to be filmed by the UV polymerization process and should be, for example, converted into a hot melt pressure-sensitive adhesive or aqueous dispersion in order to form a film without using solvents.

Patent Document 1: Japanese Unexamined Patent Application Publication (JP-A) No. H02 (1990)-47182
Patent Document 2: Japanese Unexamined Patent Application Publication (JP-A) No. H02 (1990)-45580
Patent Document 3: U.S. Pat. No. 4,181,752

DISCLOSURE OF INVENTION

Problems to be Solved by the Invention

Accordingly, an object of the present invention is to provide a viscoelastic article which exerts different properties between one surface and the other surface thereof, which has a transparent appearance, and which less causes staining of objects (articles).

Another object of the present invention is to provide a viscoelastic article which has a multilayer structure including a monomer-absorptive layer and a polymer layer containing an elastomer unevenly distributed, which can be produced without the need of organic solvents and other volatile components that place load on the environment, which includes the elastomer in a controlled distribution in the polymer layer, and which has satisfactory adhesion between the monomer-absorptive layer and the polymer layer containing the unevenly distributed elastomer.

Means for Solving the Problems

After intensive investigations to achieve the objects, the present inventors have found that, when a layer of a polymerizable composition containing at least a polymerizable monomer and an elastomer is provided on at least one side of a monomer-absorptive layer capable of absorbing the polymerizable monomer, the elastomer is allowed to migrate within the polymerizable composition layer to give a polymerizable composition layer containing the elastomer unevenly distributed; and the polymerizable composition layer containing the unevenly distributed elastomer, when polymerized, gives a multilayer structure including the monomer-absorptive layer and the polymer layer containing the unevenly distributed elastomer, in which the elastomer contained in the polymer layer of the multilayer structure is unevenly distributed in the layer and enriched in a layer surface, or in the vicinity thereof, opposite to the monomer-absorptive layer. The present invention has been made based on these findings.

Specifically, the present invention provides, in an embodiment, a viscoelastic article which has a multilayer structure including a polymer layer; and a monomer-absorptive layer present on the polymer layer and capable of absorbing at least one of monomer component(s) constituting the polymer, in which the polymer layer is a polymer layer containing an elastomer unevenly distributed in the layer and enriched at an interface, or in the vicinity thereof, opposite to another interface with the monomer-absorptive layer.

The vicinity of the interface opposite to the other interface with the monomer-absorptive layer in the viscoelastic article is preferably a region ranging from the interface opposite to the other interface with the monomer-absorptive layer and occupying, in a thickness direction, 50% or less of the total thickness of the polymer layer and the monomer-absorptive layer.

The monomer-absorptive layer in the viscoelastic article is preferably a monomer-absorptive polymer layer including a polymer.

The monomer-absorptive layer in the viscoelastic article may be a pressure-sensitive adhesive layer.

The polymer constituting the polymer layer containing the unevenly distributed elastomer in the viscoelastic article is preferably an acrylic polymer.

The present invention further provides, in another embodiment, a process for producing a viscoelastic article. The process includes the steps of providing a polymerizable composition layer containing an elastomer on at least one side of a monomer-absorptive layer, in which the polymerizable composition layer is composed of a polymerizable composition containing at least the elastomer and a polymerizable monomer, and the monomer-absorptive layer is capable of absorbing the polymerizable monomer; whereby allowing the elastomer to migrate within the polymerizable composition layer containing the elastomer, to give a polymerizable composition layer containing the elastomer being unevenly distributed in the layer and enriched at an interface, or in the vicinity thereof, opposite to another interface with the monomer-absorptive layer; and carrying out polymerization of the polymerizable composition layer containing the unevenly distributed elastomer to form a polymer layer containing the elastomer, in which the elastomer is unevenly distributed in the layer and enriched at an interface, or in the vicinity thereof, opposite to another interface with the monomer-absorptive layer, to thereby yield a viscoelastic article having a multilayer structure including the monomer-absorptive layer and the polymer layer containing the unevenly distributed elastomer.

In yet another embodiment, the present invention provides another process for producing a viscoelastic article. This process includes the steps of preparing a laminate, in which the laminate includes, in the following order, a monomer-absorptive sheet, a polymerizable composition layer containing an elastomer, and a cover film, the monomer-absorptive sheet has a monomer absorptive layer with a monomer-absorptive face, the polymerizable composition layer is present on the monomer-absorptive face of the monomer-absorptive sheet and composed of a polymerizable composition containing at least the elastomer and a polymerizable monomer, and the monomer-absorptive sheet is capable of absorbing the polymerizable monomer; allowing the elastomer to migrate within the polymerizable composition layer containing the elastomer to give a polymerizable composition layer containing the elastomer, in which the elastomer is unevenly distributed in the layer and enriched at an interface, or in the vicinity thereof, opposite to another interface with the monomer-absorptive layer; and carrying out polymerization of the polymerizable composition layer containing the unevenly distributed elastomer to form a polymer layer containing the elastomer, in which the elastomer is unevenly distributed in the layer and enriched at an interface, or in the vicinity thereof, opposite to another interface with the monomer-absorptive layer, to thereby yield a viscoelastic article having a multilayer structure including the monomer-absorptive layer and the polymer layer containing the unevenly distributed elastomer.

In still another embodiment, the present invention provides another process for producing a viscoelastic article. This process includes the steps of providing a polymerizable composition layer on at least one side of a monomer-absorptive layer, in which the polymerizable composition layer includes a polymerizable composition containing at least a polymerizable monomer, an elastomer, and a tackifier resin, and the monomer-absorptive layer is capable of absorbing the polymerizable monomer; whereby allowing the elastomer and the tackifier resin to migrate within the polymerizable composition layer to form a polymerizable composition layer containing the elastomer and the tackifier resin both being unevenly distributed in the layer and enriched at an interface, or in the vicinity thereof, opposite to another interface with the monomer-absorptive layer; and carrying out polymerization of the polymerizable composition layer to form a polymer layer containing the elastomer and the tackifier resin, in which the elastomer and the tackifier are both unevenly distributed in the layer and enriched at an interface, or in the vicinity thereof, opposite to another interface with the monomer-absorptive layer, to thereby yield a viscoelastic article having a multilayer structure including the monomer-absorptive layer and the polymer layer containing the elastomer, and the tackifier resin both unevenly distributed.

In another embodiment, the present invention provides another process for producing a viscoelastic article. This process includes the steps of preparing a laminate, in which the laminate includes, in the following order, a monomer-absorptive sheet, a polymerizable composition layer, and a cover film, the monomer-absorptive sheet has a monomer-absorptive layer with a monomer-absorptive face, the polymerizable composition layer is present on the monomer-absorptive face of the monomer-absorptive sheet and includes a polymerizable composition containing at least a polymerizable monomer, an elastomer, and a tackifier resin; allowing the elastomer and the tackifier resin to migrate within the polymerizable composition layer to form a polymerizable composition layer containing the elastomer and the tackifier resin both being unevenly distributed in the layer and enriched at an interface, or in the vicinity thereof, opposite to another interface with the monomer-absorptive layer; and carrying out polymerization of the polymerizable composition layer to form a polymer layer containing the elastomer and the tackifier resin, in which the elastomer and the tackifier resin are both unevenly distributed in the layer and enriched at an interface, or in the vicinity thereof, opposite to another interface with the monomer-absorptive layer, to thereby yield a viscoelastic article having a multilayer structure including the monomer-absorptive layer and the polymer layer containing the elastomer and the tackifier resin both unevenly distributed.

Advantages

Viscoelastic articles according to the present invention have the above configurations, can thereby exert different properties between one surface and the other surface thereof, have a transparent appearance, and less cause staining of objects to which the viscoelastic articles are applied. The viscoelastic articles can be produced without the need of organic solvents and other volatile components that place load on the environment. In addition, such multilayer structures each including a monomer-absorptive layer and a polymer layer containing an elastomer unevenly distributed can be easily produced, and the resulting multilayer structures contain the elastomer unevenly distributed in a controlled distribution in the polymer layer and have satisfactory adhesion between the monomer-absorptive layer and the polymer layer containing the unevenly distributed elastomer.

Figure 1:
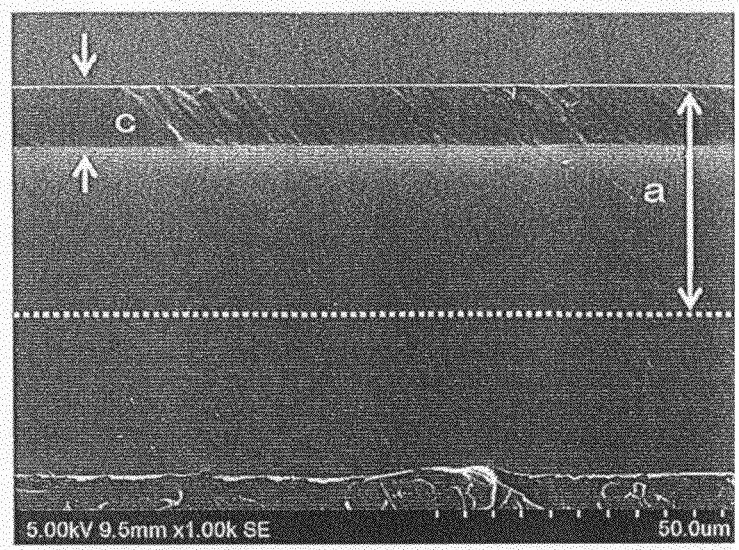
FIG. 1 is a scanning electron micrograph of a cross section of an article according to Example 1.

REFERENCE NUMERALS a photo-polymerized/cured layer containing elastomer
c elastomer-enriched portion in photo-polymerized/cured layer containing elastomer

BEST MODES FOR CARRYING OUT THE INVENTION

Viscoelastic articles according to embodiments of the present invention are viscoelastic articles (viscoelastic members) each having a multilayer structure including a polymer layer, and a monomer-absorptive layer present on the polymer layer and capable of absorbing at least one of monomer component(s) constituting the polymer layer, in which the polymer layer is a polymer layer containing an elastomer that is unevenly distributed with respect to the polymer and enriched at an interface, or in the vicinity thereof, opposite to another interface with the monomer-absorptive layer (this polymer layer is hereinafter also referred to as a "polymer layer containing (the) unevenly distributed elastomer"). The portion where the elastomer is enriched is generally in the form of a layer.

In the polymer layer containing the unevenly distributed elastomer, the elastomer is unevenly distributed and enriched in a portion at an interface, or in the vicinity thereof, opposite to another interface with the monomer-absorptive layer. This portion is hereinafter also referred to as an "elastomer-enriched portion" or an "elastomer-banded layer". The viscoelastic articles particularly develop properties which the elastomer inherently has in the elastomer-enriched portion. Exemplary properties which the elastomer inherently has include physical or chemical properties such as viscoelasticity, flexibility, adhesiveness (tackiness, pressure-sensitive adhesiveness) to nonpolar adherends, elasticity (rubber elasticity), thermal stability (heat resistance), and chemical resistance; optical properties such as refraction properties; and electrical properties such as electrical insulation properties and dielectric properties. Specifically, the viscoelastic articles develop such properties which the elastomer inherently has in a layer surface (surface provided by the polymer layer containing the unevenly distributed elastomer) of the polymer layer containing the unevenly distributed elastomer, which layer surface is opposite to the monomer-absorptive layer. This is because the elastomer concentrates and is enriched in the elastomer-enriched portion.

As used herein the term "interface" refers to an interfacial boundary through which two different substances are in contact with each other. By way of example, when existing in an atmosphere (air), the surface of the polymer layer containing the unevenly distributed elastomer in the viscoelastic article is naturally in contact with the atmosphere and is thereby present as an "interface". In the polymer layer containing the unevenly distributed elastomer in the article, the interface, or the vicinity thereof, opposite to another interface with the monomer-absorptive layer is hereinafter also referred to as a "layer surface or the vicinity thereof" or "surface or the vicinity thereof". When the polymer layer containing the unevenly distributed elastomer is an outermost layer, the interface, or the vicinity thereof, opposite to the other interface with the monomer-absorptive layer constitutes a surface, or the vicinity thereof, of the viscoelastic article.

When having the polymer layer containing the unevenly distributed elastomer as an outermost layer, the viscoelastic article can be used as a surface-viscoelastic article, because the article develops properties which the elastomer inherently has in the surface, or in the vicinity thereof, of the article. Accordingly, a viscoelastic article according to an embodiment of the present invention may be a surface-viscoelastic article, which has a multilayer structure including a polymer layer and a monomer-absorptive layer present on the polymer layer, in which the polymer layer contains an elastomer unevenly distributed in the layer and enriched in the layer surface or the vicinity thereof, and the monomer-absorptive layer is capable of absorbing at least one of monomer component(s) constituting the polymer of the polymer layer containing the unevenly distributed elastomer, and the surface-viscoelastic article utilizes the surface of the polymer layer containing the unevenly distributed elastomer in the multilayer structure as a face at which properties which the elastomer inherently has are developed.

The viscoelastic articles are generally in the form of a tape or sheet, though shapes or forms of the viscoelastic articles are not particularly limited and can be chosen as appropriate according to necessity, as long as having a multilayer structure including the monomer-absorptive layer and the polymer layer containing the unevenly distributed elastomer. A viscoelastic article in an embodiment has a surface (i.e., surface of the polymer layer containing the unevenly distributed elastomer or of the monomer-absorptive layer) having self-adhesiveness (tackiness). This viscoelastic article can be used as a pressure-sensitive adhesive tape or sheet. In another embodiment, a viscoelastic article has two adhesive faces (pressure-adhesive faces) both as the surface of the monomer-absorptive layer and the surface of the polymer layer containing the unevenly distributed elastomer opposite to the monomer-absorptive layer and is in the form of a tape or sheet. This viscoelastic article can be used as a double-sided pressure-sensitive adhesive tape or sheet. In yet another embodiment, a viscoelastic article is formed as a pressure-sensitive adhesive tape or sheet by further providing a pressure-sensitive adhesive layer (tacky adhesive layer) composed of a known pressure-sensitive adhesive (tacky adhesive). Exemplary pressure-sensitive adhesives herein include acrylic pressure-sensitive adhesives, rubber pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, fluorine-containing pressure-sensitive adhesives, and epoxy pressure-sensitive adhesives.

The viscoelastic articles may also be in the form of a film. Independently, the viscoelastic articles may be wound into a roll or may be stacked to form a laminate of sheets.

The surface of the polymer layer containing the unevenly distributed elastomer and/or the surface of the monomer-absorptive layer in the viscoelastic articles may be protected by a cover film. The cover film may have releasability or not.

Upon the use of the viscoelastic articles, the cover film may be removed (peeled off) or may remain as intact to constitute a part of the articles without removing therefrom.

In an embodiment, a viscoelastic article has a monomer-absorptive sheet having a monomer-absorptive layer. In this embodiment, the monomer-absorptive layer of the monomer-absorptive sheet is used as the above-mentioned monomer-absorptive layer. Independently, viscoelastic articles may include one or more other layers such as intermediate layers and under coats, within ranges not adversely affecting the advantages of the present invention.

[Polymerizable Composition Layer Containing Elastomer]

The polymerizable composition layer containing the elastomer is a layer formed from a polymerizable composition containing at least an elastomer, and a polymerizable monomer that is polymerizable by the action of light and/or heat. Typically for satisfactory handleability and coatability, the polymerizable composition containing the elastomer may be a partially polymerized composition, part of whose components has been polymerized.

The polymerizable composition contains at least the elastomer and a polymerizable monomer that is polymerizable by the action of light and/or heat. Where necessary, the polymerizable composition may further contain one or more polymerization initiators such as photoinitiators and thermopolymerization initiators.

The polymerizable composition layer containing the elastomer gives a polymer layer containing the elastomer unevenly distributed according to the following mechanism. (i) The polymerizable composition layer containing the elastomer undergoes polymerization and curing by the application of active energy rays or heat to form a polymer layer (cured layer). In addition, (ii) when the polymerizable composition layer containing the elastomer is provided so as to be in contact with the monomer-absorptive layer, the polymerizable monomer in the polymerizable composition layer containing the elastomer is absorbed by the monomer-absorptive layer. Accordingly, (iii) the elastomer migrates in the polymerizable composition layer to form a polymerizable composition layer containing the elastomer, in which the elastomer is unevenly distributed in the layer and enriched at an interface, or in the vicinity thereof, opposite to another interface with the monomer-absorptive layer (i.e., in the layer surface or the vicinity thereof).

It is important that the polymerizable monomer is a compound that can undergo polymerization, such as radical polymerization or cationic polymerization, by using light energy and/or heat energy, irrespective of the reaction mechanism of polymerization. Exemplary polymerizable monomers include radically polymerizable monomers such as acrylic monomers to form acrylic polymers; cationically polymerizable monomers such as epoxy monomers to form epoxy resins, oxetane monomers to form oxetane resins, and vinyl ether monomers to form vinyl ether resins; combinations of polyisocyanates with polyols to form urethane resins; and combinations of polycarboxylic acids with polyols to form polyester resins. Among them, acrylic monomers are preferably used. Each of different polymerizable monomers may be used alone or in combination.

The acrylic polymers, epoxy resins, oxetane resins, vinyl ether resins, urethane resins, and polyester resins work typically as base polymers for acrylic pressure-sensitive adhesives (tacky adhesives), base polymers for epoxy pressure-sensitive adhesives, base polymers for oxetane pressure-sensitive adhesives, base polymers for vinyl ether pressure-sensitive adhesives, base polymers for urethane pressure-sensitive adhesives, and base polymers for polyester pressure-sensitive adhesives, respectively. The polymerizable composition containing the elastomer may therefore be a pressure-sensitive adhesive composition which contains an elastomer (hereinafter also referred to as a "pressure-sensitive adhesive composition containing the elastomer"). Accordingly, the polymer layer containing the unevenly distributed elastomer formed through curing of the polymerizable composition containing the elastomer may be a pressure-sensitive adhesive layer containing an unevenly distributed elastomer formed through polymerization of the pressure-sensitive adhesive composition containing the elastomer. In a preferred embodiment of the present invention, an acrylic monomer is used as the polymerizable monomer. The pressure-sensitive adhesive composition containing the elastomer is therefore preferably an acrylic pressure-sensitive adhesive composition containing the elastomer. The polymer for use herein to constitute the polymer layer containing the unevenly distributed elastomer constituting the viscoelastic article is preferably an acrylic polymer.

Of such acrylic monomers, (meth)acrylic esters are preferred, of which alkyl (meth)acrylates, (meth)acrylic esters having an alicyclic hydrocarbon group, and (meth)acrylic esters having an oxygen-containing heterocyclic group are more preferred. Each of different alkyl (meth)acrylates may be used alone or in combination.

Exemplary alkyl (meth)acrylates include alkyl (meth)acrylates whose alkyl moiety having 1 to 20 carbon atoms, such as methyl (meth)acrylates, ethyl (meth)acrylates, propyl (meth)acrylates, isopropyl (meth)acrylates, butyl (meth)acrylates, isobutyl (meth)acrylates, s-butyl (meth)acrylates, t-butyl (meth)acrylates, pentyl (meth)acrylates, isopentyl (meth)acrylates, hexyl (meth)acrylates, heptyl (meth)acrylates, octyl (meth)acrylates, 2-ethylhexyl (meth)acrylates, isooctyl (meth)acrylates, nonyl (meth)acrylates, isononyl (meth)acrylates, decyl (meth)acrylates, isodecyl (meth)acrylates, undecyl (meth)acrylates, dodecyl (meth)acrylates, tridecyl (meth)acrylates, tetradecyl (meth)acrylates, pentadecyl (meth)acrylates, hexadecyl (meth)acrylates, heptadecyl (meth)acrylates, octadecyl (meth)acrylates, nonadecyl (meth)acrylates, and eicosyl (meth)acrylates; of which alkyl (meth)acrylates whose alkyl moiety having 2 to 14 carbon atoms are preferred, and alkyl (meth)acrylates whose alkyl moiety having 2 to 10 carbon atoms are more preferred.

Exemplary (meth)acrylic esters having an alicyclic hydrocarbon groups include cyclopentyl (meth)acrylates, cyclohexyl (meth)acrylates, and isobornyl (meth)acrylates. Exemplary (meth)acrylic esters having an oxygen-containing heterocyclic group include tetrahydrofurfuryl acrylate.

Examples of (meth)acrylic esters further include (meth)acrylic esters having an aromatic hydrocarbon group, such as phenyl (meth)acrylates; and polyalkylene glycol (meth)acrylates, in addition to the alkyl (meth)acrylates, (meth)acrylic esters having an alicyclic hydrocarbon group, and (meth) acrylic esters having an oxygen-containing heterocyclic group.

Each of different (meth)acrylic esters can be used alone or in combination. When one or more (meth)acrylic esters are used as main monomer components for constituting the polymerizable composition containing the elastomer, it is important that the proportion of (meth)acrylic esters is, for example, 60 percent by weight or more, and preferably 80 percent by weight or more, based on the total amount of monomer components constituting the polymerizable composition containing the elastomer. The (meth)acrylic esters herein are represented by alkyl (meth)acrylates, (meth)acrylic esters having an alicyclic hydrocarbon group, and (meth)acrylic esters having an oxygen-containing heterocyclic group.

The polymerizable composition containing the elastomer may further contain one or more copolymerizable monomers as monomer components. Typically, in an embodiment, the polymerizable composition is an acrylic polymerizable composition containing an elastomer, and a (meth)acrylic ester as a main monomer component constituting the polymerizable composition. This acrylic polymerizable composition may further contain one or more copolymerizable monomers such as polar-group-containing monomers and multifunctional monomers. The use of such copolymerizable monomers as monomer components can, for example, improve the viscoelastic performance of the polymer layer containing the unevenly distributed elastomer and improve the cohesive strength of the polymer in the polymer layer. Each of different copolymerizable monomers can be used alone or in combination.

Examples of the polar-group-containing monomers include carboxyl-containing monomers such as (meth) acrylic acids, itaconic acid, maleic acid, fumaric acid, crotonic acid, and isocrotonic acid, and anhydrides of them, such as maleic anhydride; hydroxyl-containing monomers including hydroxylalkyl (meth)acrylates such as hydroxyethyl (meth)acrylates, hydroxypropyl (meth)acrylates, and hydroxybutyl (meth)acrylates; amido-containing monomers such as acrylamide, methacrylamide, N,N-dimethyl(meth) acrylamides, N-methylol(meth)acrylamides, N-methoxymethyl(meth)acrylamides, and N-butoxymethyl(meth)acrylamides; amino-containing monomers such as aminoethyl (meth)acrylates, dimethylaminoethyl (meth)acrylates, and t-butylaminoethyl (meth)acrylates; glycidyl-containing monomers such as glycidyl (meth)acrylates and methylglycidyl (meth)acrylates; cyano-containing monomers such as acrylonitrile and methacrylonitrile; and heterocycle-containing vinyl monomers such as N-vinyl-2-pyrrolidone, (meth) acryloylmorpholine, as well as N-vinylpyridine, N-vinylpiperidone, N-vinylpyrimidine, N-vinylpiperazine, N-vinylpyrazine, N-vinylpyrrole, N-vinylimidazole, and N-vinyloxazole. Of these polar-group-containing monomers, preferred are carboxyl-containing monomers, such as acrylic acid, and anhydrides of them.

The amount of polar-group-containing monomers can be modified as appropriate according to the purpose and intended use of the resulting viscoelastic article. Typically, when the viscoelastic article is used in applications where the polymer layer containing the unevenly distributed elastomer should have adhesion (e.g., adhesion typically to a glass or plastic container), the amount is 30 percent by weight or less (e.g., from 1 to 30 percent by weight), and preferably from 3 to 20 percent by weight, based on the total amount of monomer components. Polar-group-containing monomers, if used in an amount of more than 30 percent by weight based on the total amount of monomer components, may typically cause the polymer layer containing the unevenly distributed elastomer to be excessively hard (rigid) and to thereby have insufficient adhesion. In contrast, if the amount of polar-group-containing monomers is excessively small (e.g., less than 1 percent by weight based on the total amount of monomer components), for example, the polymer layer containing the unevenly distributed elastomer may have insufficient cohesive strength to fail to develop high shearing force, or the polymer layer may have excessively high tack on its surface, and this may impede the handling of the resulting viscoelastic article.

When the viscoelastic article is used in applications where the polymer layer containing the unevenly distributed elastomer should have hard properties (e.g., in hard coating applications), the amount of polar-group-containing monomers is 95 percent by weight or less (e.g., from 0.01 to 95 percent by weight), and preferably from 1 to 70 percent by weight, based on the total amount of monomer components. Polar-group-containing monomers, if used in an amount of more than 95 percent by weight, may typically cause the viscoelastic article to have insufficient water-proofness to thereby suffer from being significantly affected in quality by the use conditions such as humidity and water. In contrast, if the amount of polar-group-containing monomers is excessively small (e.g., 0.01 percent by weight or less), large amounts of (meth) acrylic esters having high glass transition temperatures (Tg) (e.g., isobornyl acrylate) and/or multifunctional monomers are needed to provide satisfactory hard properties, and this may cause the resulting viscoelastic article to be excessively fragile.

Exemplary multifunctional monomers include hexanediol di(meth)acrylates, (poly)ethylene glycol di(meth)acrylates, (poly)propylene glycol di(meth)acrylates, neopentyl glycol di(meth)acrylates, pentaerythritol di(meth)acrylates, pentaerythritol tri(meth)acrylates, dipentaerythritol hexa(meth) acrylates, trimethylolpropane tri(meth)acrylates, tetramethylolmethane tri(meth)acrylates, allyl (meth)acrylates, vinyl (meth)acrylates, divinylbenzene, epoxy acrylates, polyester acrylates, urethane acrylates, butyl di(meth)acrylates, and hexyl di(meth)acrylates.

The amount of multifunctional monomers can be modified as appropriate according to the purpose and intended use of the resulting viscoelastic article. Typically, when the viscoelastic article is used in applications where the polymer layer containing the unevenly distributed elastomer should have adhesion (e.g., adhesion or self-adhesiveness typically to a glass or plastic container), the amount of multifunctional monomers is 2 percent by weight or less (e.g., from 0.01 to 2 percent by weight), and preferably from 0.02 to 1 percent by weight, based on the total amount of monomer components. Multifunctional monomers, if used in an amount of more than 2 percent by weight based on the total amount of monomer components, may typically cause the polymer layer containing the unevenly distributed elastomer to have an excessively high cohesive strength to thereby be excessively hard and have insufficient adhesion. In contrast, if the amount of multifunctional monomers is excessively small (e.g., less than 0.01 percent by weight based on the total amount of monomer components), for example, the polymer layer containing the unevenly distributed elastomer may have an insufficient cohesive strength and thereby have excessively high tack on surface, and this may impede the handling of the resulting viscoelastic article.

When the viscoelastic article is used in applications where the polymer layer containing the unevenly distributed elastomer should have hard properties (e.g., in hard coating applications), the amount of multifunctional monomers is 95 percent by weight or less (e.g., from 0.01 to 95 percent by weight), and preferably from 1 to 70 percent by weight, based on the total amount of monomer components. Multifunctional monomers, if used in an amount of more than 95 percent by weight based on the total amount of monomer components, may cause large shrinkage upon curing through polymerization to thereby impede the formation of a viscoelastic article in the form of a uniform film or sheet, or may cause the resulting viscoelastic article to be excessively fragile. In contrast, if the amount of multifunctional monomers is excessively small (e.g., 0.01 percent by weight or less), the resulting viscoelastic article may not have sufficient solvent resistance and/or sufficient thermal stability.

In addition to the polar-group-containing monomers and multifunctional monomers, examples of copolymerizable monomers further include vinyl esters such as vinyl acetate and vinyl propionate; aromatic vinyl compounds such as styrene and vinyltoluene; olefins or dienes, such as ethylene, butadiene, isoprene, and isobutylene; vinyl ethers such as vinyl alkyl ethers; vinyl chloride; alkoxyalkyl (meth)acrylate monomers such as methoxyethyl (meth)acrylates and ethoxyethyl (meth)acrylates; sulfo-containing monomers such as sodium vinylsulfonate; phosphate-containing monomers such as 2-hydroxyethylacryloyl phosphate; imido-containing monomers such as cyclohexylmaleimide and isopropylmaleimide; isocyanate-containing monomers such as 2-methacryloyloxyethyl isocyanate; fluorine-containing (meth)acrylates; and silicon-containing (meth)acrylates.

Where necessary, one or more polymerization initiators, such as any of thermopolymerization initiators and photoinitiators (photopolymerization initiators), may be used in the composition. Specifically, the formation of the polymer layer containing the unevenly distributed elastomer herein may be performed through a curing reaction by the action of heat and/or active energy rays with one or more polymerization initiators such as thermopolymerization initiators and photoinitiators (photopolymerization initiators). This allows the polymerizable composition layer containing the unevenly distributed elastomer to be cured while maintaining the structure in which the elastomer is unevenly distributed in the layer. This in turn easily gives a polymer layer containing the elastomer, in which the elastomer is unevenly distributed in the layer and enriched at an interface, or in the vicinity thereof, opposite to another interface with the monomer-absorptive layer (in the layer surface or the vicinity thereof).

Though not especially limited, exemplary photoinitiators usable herein include benzoin ether photoinitiators, acetophenone photoinitiators, α-ketol photoinitiators, aromatic sulfonyl chloride photoinitiators, photoactive oxime photoinitiators, benzoin photoinitiators, benzil photoinitiators, benzophenone photoinitiators, ketal photoinitiators, and thioxanthone photoinitiators. Each of different photoinitiators can be used alone or in combination.

Specifically, exemplary ketal photoinitiators include 2,2-dimethoxy-1,2-diphenylethan-1-one [e.g., trade name "IRGACURE 651" (supplied by Ciba Specialty Chemicals Corporation)]. Exemplary acetophenone photoinitiators include 1-hydroxycyclohexyl phenyl ketone [e.g., trade name "IRGACURE 184" (supplied by Ciba Specialty Chemicals Corporation)], 2,2-diethoxyacetophenone, 2,2-dimethoxy-2-phenylacetophenone, 4-phenoxydichloroacetophenone, and 4-(t-butyl)dichloroacetophenone. Exemplary benzoin ether photoinitiators include benzoin methyl ether, benzoin ethyl ether, benzoin propyl ether, benzoin isopropyl ether, and benzoin isobutyl ether. Exemplary acylphosphine oxide photoinitiators include trade name "Lucirin TPO" (supplied by BASF AG). Exemplary α-ketol photoinitiators include 2-methyl-2-hydroxypropiophenone and 1-[4-(2-hydroxyethyl)phenyl]-2-methylpropan-1-one. Exemplary aromatic sulfonyl chloride photoinitiators include 2-naphthalenesulfonyl chloride. Exemplary photoactive oxime photoinitiators include 1-phenyl-1,1-propanedione-2-(o-ethoxycarbonyl)-oxime. Exemplary benzoin photoinitiators include benzoin. Exemplary benzil photoinitiators include benzil (dibenzoyl). Exemplary benzophenone photoinitiators include benzophenone, benzoylbenzoic acid, 3,3'-dimethyl-4-methoxybenzophenone, polyvinylbenzophenone, and α-hydroxycyclohexyl phenyl ketone. Exemplary thioxanthone photoinitiators include thioxanthone, 2-chlorothioxanthone, 2-methylthioxanthone, 2,4-dimethylthioxanthone, isopropylthioxanthone, 2,4-diisopropylthioxanthone, and dodecylthioxanthone.

Though not critical, the amount of photoinitiators can be chosen within ranges of, for example, from 0.01 to 5 parts by weight, and preferably from 0.05 to 3 parts by weight, per 100 parts by weight of the total monomer components constituting the polymerizable composition containing the elastomer.

The curing of the polymerizable composition layer containing the unevenly distributed elastomer to form a polymer layer containing the elastomer unevenly distributed may be performed while utilizing a curing reaction by the action of active energy rays. Exemplary active energy rays include ionizing radiations such as alpha rays, beta rays, gamma rays, neutron beams, and electron beams; and ultraviolet rays, of which ultraviolet rays are preferred. Conditions for the application of active energy rays, such as irradiation energy, irradiation time (duration), and irradiation procedure, are not especially limited, as long as the polymerizable composition layer containing the unevenly distributed elastomer can be cured to form a polymer layer containing the elastomer unevenly distributed.

Exemplary thermopolymerization initiators include azo polymerization initiators such as azobisisobutyronitrile, 2,2'-azobis-2-methylbutyronitrile, dimethyl 2,2'-azobis(2-methylpropionate), 4,4'-azobis-4-cyanovaleric acid, azobisisovaleronitrile, 2,2"-azobis(2-amidinopropane)dihydrochloride, 2,2'-azobis[2-(5-methyl-2-imidazolin-2-yl)propane]dihydrochloride, 2,2"-azobis(2-methylpropionamidine)disulfate, and 2,2"-azobis(N,N'-dimethyleneisobutylamidine)dihydrochloride; peroxide polymerization initiators such as dibenzoyl peroxide and tert-butyl permaleate; and redox polymerization initiators such as the combination of an organic peroxide and a vanadium compound, the combination of an organic peroxide and dimethylaniline, and the combination of a naphthenic acid metal salt and butylaldehyde, aniline or acetylbutyrolactone. The amount of thermopolymerization initiators is not especially limited and can be chosen within such a range as to be usable as thermopolymerization initiators. The use of one or more redox polymerization initiators as the thermopolymerization initiators enables the composition to be polymerized at room temperature.

Though not limited, as long as being elastomers exerting rubber elasticity, examples of the elastomer include natural rubbers or synthetic rubbers, such as natural rubbers (NRs), grafted natural rubbers, isoprene rubbers (IRs), butadiene rubbers (BRs), chloroprene rubbers (CRs), nitrile-isobutylene-isoprene rubbers (NBRs), styrene-butadiene rubbers (SBRs), isobutylene-isoprene rubbers (IIRs), ethylene-propylene rubbers (EPDMs), and polyisobutylenes; olefinic elastomers such as ethylene-propylene copolymers, ethylene-propylene-diene copolymers, ethylene-vinyl acetate copolymers, polybutenes, and chlorinated polyethylenes; styrenic elastomers such as styrene-butadiene multiblock copolymers (SBSs), styrene-isoprene multiblock copolymers (SISs), styrene-ethylene/butylene multiblock copolymers (SEBSs), styrene-ethylene/propylene multiblock copolymers (SEPSs), and hydrogenated products of them; polyester elastomers; polyamide elastomers; polyurethane elastomers; and silicone elastomers. Each of different elastomers can be used alone or in combination.

Among them, hydrocarbon elastomers are preferred because of their wide design ranges. Of such hydrocarbon elastomers, more preferred are styrenic elastomers such as styrene-butadiene multiblock copolymers (SBSs), styrene-isoprene multiblock copolymers (SISs), styrene-ethylene/butylene multiblock copolymers (SEBSs), and styrene-ethylene/propylene multiblock copolymers (SEPS), because they can be chosen within wider ranges with respect typically to the styrene concentration and molecular weight.

The amount of the elastomer in the polymer layer containing the unevenly distributed elastomer is not especially limited and can be chosen within such a range that the amount of the elastomer in the polymerizable composition is, for example, from 0.001 to 100 parts by weight, preferably from 0.01 to 70 parts by weight, and more preferably from 0.1 to 50 parts by weight, per 100 parts by weight of the total monomer components constituting the polymerizable composition containing the elastomer for the formation of the polymer layer containing the unevenly distributed elastomer. Elastomers, if used in the polymerizable composition in an amount of more than 100 parts by weight, may impede the production of a viscoelastic article or may cause the resulting viscoelastic article to suffer from problems in its strength. Elastomers, if used in the polymerizable composition in an amount of less than 0.001 part by weight, may not disperse and exist, on the average, in the surface or the vicinity thereof (at an interface, or in the vicinity thereof, opposite to another interface with the monomer-absorptive layer) of the polymer layer containing the unevenly distributed elastomer, and the resulting viscoelastic article may not develop properties which the elastomer inherently has.

The polymerizable composition containing the elastomer may further contain one or more appropriate additives according to necessity. Exemplary additives herein include surfactants such as ionic surfactants, silicone surfactants, and fluorochemical surfactants; crosslinking agents such as polyisocyanate crosslinking agents, silicone crosslinking agents, epoxy crosslinking agents, and alkyl-etherified melamine crosslinking agents; tackifier resins (tackifiers); plasticizers; fillers; age inhibitors; antioxidants; colorants such as pigments and dyestuffs; and various polymers as viscosity modifiers, such as acrylic resins, urethane resins, polyester resins, synthetic rubbers, and natural rubbers.

Typically, for coloring the polymer layer containing the unevenly distributed elastomer, one or more pigments (coloring pigments) are usable within a range not adversely affecting the polymerization reaction such as photopolymerization reaction. When the polymer layer containing the unevenly distributed elastomer is to be colored black, carbon black can be used as the coloring pigment. The amount of carbon black is desirably chosen within ranges of, for example, 0.15 part by weight or less (e.g., from 0.001 to 0.15 part by weight) and preferably from 0.02 to 0.1 part by weight, per 100 parts by weight of the total monomer components constituting the polymerizable composition containing the elastomer. These ranges are desirable from the viewpoints of obtaining suitable degree of coloring and not adversely affecting the photopolymerization reaction.

Among such additives, the polymerizable composition containing the elastomer preferably further contain one or more tackifier resins in order to modify the elastomer contained therein. Specifically, the polymerizable composition containing the elastomer is preferably a polymerizable composition containing an elastomer, which contains at least a polymerizable monomer, the elastomer, and a tackifier resin.

When the polymerizable composition layer containing the elastomer and further containing a tackifier resin is provided so as to be in contact with the monomer-absorptive layer, the polymerizable monomer is absorbed by the monomer-absorptive layer; this allows not only the elastomer but also the tackifier resin to migrate within the polymerizable composition layer; and the polymerizable composition layer is converted into a polymerizable composition layer containing both the elastomer and the tackifier resin, in which the elastomer and the tackifier rein are unevenly distributed in the layer and enriched at an interface, or in the vicinity thereof, opposite to another interface with the monomer-absorptive layer (in the layer surface or the vicinity thereof). The resulting polymerizable composition layer, when cured, gives a polymer layer containing the elastomer and the tackifier resin, in which the elastomer and the tackifier resin are both unevenly distributed in the layer and enriched at an interface, or in the vicinity thereof, opposite to another interface with the monomer-absorptive layer (in the layer surface or the vicinity thereof).

In the polymer layer containing the elastomer and the tackifier resin both unevenly distributed, a portion where the elastomer and the tackifier resin are enriched acts as a rubber pressure-sensitive adhesive layer (film of rubber pressure-sensitive adhesive), because the elastomer is modified in the portion where the elastomer and the tackifier resin are enriched. In some cases, the resulting viscoelastic article develops properties which the elastomer inherently has to a further extent.

Exemplary tackifier resins (tackifiers) include rosins, rosin derivative resins, polyterpene resins, petroleum resins, coumarone-indene resins, styrenic resins, phenolic resins, and xylene resins.

The tackifier resins for use herein are preferably resins that are miscible with the polymerizable monomer but are immiscible with a polymer formed from the polymerizable monomer, because resins of this type are satisfactorily miscible with the elastomer and enable easy production of the article. Specifically, in an embodiment, an acrylic monomer is used as the polymerizable monomer. In this embodiment, petroleum resins and terpene resins are preferred because these resins are miscible with the acrylic monomer but are sparingly miscible with an acrylic polymer formed from the acrylic monomer, and the resins are satisfactorily miscible with rubber viscoelastic materials. Among them, hydrogenated petroleum resins and hydrogenated terpene resins are more preferred.

The polymerizable composition containing the elastomer may be prepared by homogeneously blending and dispersing the respective components with each other. The polymerizable composition containing the elastomer is desirably controlled to have a viscosity suitable for coating (application) operation, because the polymerizable composition is generally formed into a sheet typically through coating to a base material. The viscosity of the polymerizable composition containing the elastomer can be controlled, for example, by incorporating polymers such as acrylic rubbers, polyurethanes, and thickening additives; and/or by polymerizing part of the polymerizable monomer in the polymerizable composition containing the elastomer through photoirradiation and/or heating. The viscosity is preferably from 5 to 50 Pa·s, and more preferably from 10 to 40 Pa·s, as determined by using a BH type viscometer with a No. 5 rotor under conditions at a number of revolutions of 10 rpm and a measurement temperature of 30° C. A polymerizable composition, if having a viscosity of less than 5 Pa·s, may not remain on the base material when applied thereto. In contrast, a polymerizable composition, if having an excessively high viscosity of more than 50 Pa·s, may be difficult to be applied by coating.

The application (coating) of the polymerizable composition containing the elastomer may be performed typically using a common coater such as comma roll coater, die roll coater, rotogravure roll coater, reverse roll coater, kiss roll coater, dip roll coater, bar coater, knife coater, or spray coater.

A layer of the polymerizable composition containing the elastomer is formed by applying the polymerizable composition to a predetermined surface of an appropriate carrier using any of such common coaters. Examples of the predetermined surface include a face provided by the monomer-absorptive layer; a monomer-absorptive face of the monomer-absorptive sheet; and a releasably treated surface of the cover film.

[Monomer-Absorptive Sheet]

A viscoelastic article according to an embodiment of the present invention is produced by forming a polymerizable composition layer containing an elastomer on one or both sides of a monomer-absorptive layer from a polymerizable composition containing the elastomer; allowing the elastomer to migrate in the polymerizable composition layer containing the elastomer, to give a polymerizable composition layer containing the elastomer, in which the elastomer is unevenly distributed in the layer and enriched at an interface, or in the vicinity thereof, opposite to another interface with the monomer-absorptive layer; and carrying out polymerization of the polymerizable composition layer containing the unevenly distributed elastomer to form a polymer layer containing the elastomer unevenly distributed, to thereby yield a multilayer structure including the monomer-absorptive layer and the polymer layer containing the unevenly distributed elastomer.

The shape and other conditions of the monomer-absorptive sheet for use herein are not especially limited, as long as the sheet has at least a monomer-absorptive layer which provides a monomer-absorptive face capable of absorbing at least one monomer component from the polymerizable composition containing the elastomer.

Exemplary monomer-absorptive sheets include a monomer-absorptive sheet including a monomer-absorptive layer alone (hereinafter also referred to as a "carrier-less monomer-absorptive sheet"); and a monomer-absorptive sheet including a base material, and a monomer-absorptive layer present on the base material (hereinafter also referred to as a "supported monomer-absorptive sheet"). When the monomer-absorptive sheet is a carrier-less monomer-absorptive sheet, either one of both surfaces may provide the monomer-absorptive face. In contrast, when the monomer-absorptive sheet is a supported monomer-absorptive sheet, the surface of the monomer-absorptive layer provides the monomer-absorptive face.

(Monomer-Absorptive Layer)

The monomer-absorptive layer is a layer providing a monomer-absorptive face in the monomer-absorptive sheet and has only to be capable of absorbing at least a polymerizable monomer from the polymerizable composition layer containing the elastomer provided on the monomer-absorptive face. Exemplary materials for constituting the monomer-absorptive layer include sheets made from papers such as kraft paper, crepe paper, and Japanese paper; fibrous sheets such as woven fabrics, nonwoven fabrics, and nets; porous films; polymers such as acrylic polymers, polyurethane resins, ethylene-vinyl acetate copolymers, and epoxy resins; natural rubbers; and synthetic rubbers. The monomer-absorptive layer may include each of different materials alone or in combination.

In a preferred embodiment of the present invention, one or more polymers are used as materials for constituting the monomer-absorptive layer. Specifically, the monomer-absorptive layer is preferably a monomer-absorptive polymer layer including one or more polymers; and the monomer-absorptive sheet is preferably a sheet having a polymer layer. Though not limited, the polymers herein are preferably polymers having at least one monomer component in common with polymerizable monomer(s) contained in the polymerizable composition containing the elastomer. Typically, when an acrylic polymerizable composition containing an elastomer is used as the polymerizable composition containing the elastomer, the polymer constituting the monomer-absorptive layer is preferably an acrylic polymer. This is because an acrylic monomer as the polymerizable monomer of the acrylic polymerizable composition containing the elastomer is in common in constitutional unit with the acrylic polymer constituting the monomer-absorptive layer, and this accelerates the migration of the acrylic monomer as the polymerizable monomer.

The monomer-absorptive layer may be also composed of a polymer layer formed through polymerization of a polymerizable composition having the same formulation as that of the polymerizable composition containing the elastomer, except for removing the elastomer therefrom.

Independently, the monomer-absorptive layer may be also a pressure-sensitive adhesive layer (tacky adhesive layer or self-adhesive layer) formed from a pressure-sensitive adhesive (tacky adhesive). Exemplary pressure-sensitive adhesives include acrylic pressure-sensitive adhesives, epoxy pressure-sensitive adhesives, oxetane pressure-sensitive adhesives, vinyl ether pressure-sensitive adhesives, urethane pressure-sensitive adhesives, and polyester pressure-sensitive adhesives. Typically, when an acrylic monomer is used as the polymerizable monomer, the pressure-sensitive adhesive for constituting the monomer-absorptive layer is preferably an acrylic pressure-sensitive adhesive including an acrylic polymer as the base polymer, because the acrylic pressure-sensitive adhesive sheet is in common in constitutional unit with the acrylic monomer as the polymerizable monomer, and this facilitates the monomer-absorptive layer to absorb the polymerizable monomer to a further extent.

The volume of the monomer-absorptive layer may be constant or may vary between before and after the absorption of the polymerizable monomer. Typically, in an embodiment, the monomer-absorptive layer is a layer formed from one or more polymeric materials. Exemplary polymeric materials include the-mentioned polymers such as acrylic polymers, polyurethane resins, ethylene-vinyl acetate copolymers, and epoxy resins; and polymers each formed through polymerization of a polymerizable composition having the same formulation as that of the polymerizable composition containing the elastomer, except for removing the elastomer therefrom. In this embodiment, the volume of the layer of polymeric material as the monomer-absorptive layer generally increases as a result of absorbing the polymerizable monomer from the polymerizable composition layer containing the elastomer. In other words, the polymeric material constituting the monomer-absorptive layer swells as a result of absorbing the polymerizable monomer. Accordingly, the monomer-absorptive layer may be a swellable with the monomer and increase its volume as a result of absorbing the polymerizable monomer.

The monomer-absorptive layer, typically when being a layer of the polymeric material, may be formed by applying the polymeric material to a predetermined surface of an appropriate carrier (e.g., a base material mentioned below or a releasably treated surface of the cover film) with any of the common coaters. The polymeric material layer as the monomer-absorptive layer provided on the carrier may be subjected to drying and/or curing (e.g., curing by the action of light (photocuring)) according to necessity. The polymeric material may be controlled to have a viscosity suitable for the application by compounding any of polymers such as acrylic rubbers and thickening additives; and/or by polymerizing part of the polymerizable monomer through heating and/or photoirradiation, before being applied to the predetermined surface of the appropriate carrier.

Though not critical, the thickness of the monomer-absorptive layer before absorbing the polymerizable monomer can be chosen within ranges of, for example, from 1 to 2000 µm, preferably from 2 to 1000 µm, and more preferably from 5 to 500 µm. The monomer-absorptive layer may have a single-layer structure or multilayer structure.

(Base Material)

When the monomer-absorptive sheet is a supported monomer-absorptive sheet, a base material is used therein. Exemplary base materials usable herein include appropriate thin articles including paper base materials such as papers; fibrous base materials such as woven fabrics, nonwoven fabrics, and nets; metallic base materials such as metallic foils and metallic plates; plastic base materials such as plastic films and plastic sheets; rubber base materials such as rubber sheets; foams such as foamed sheets; and laminates of these materials [e.g., a laminate of a plastic base material and another base material; and a laminate of plastic films (or sheets) with each other]. Plastic base materials such as plastic films or sheets are preferably used as the base material. Exemplary materials for the plastic films or sheets include olefinic resins containing an α-olefin as a monomer component, such as polyethylenes (PEs), polypropylenes (PPs), ethylene-propylene copolymers, and ethylene-vinyl acetate copolymers (EVAs); polyester resins such as poly(ethylene terephthalate)s (PETs), poly(ethylene naphthalate)s (PENs), and poly(butylene terephthalate)s (PBTs); poly(vinyl chloride)s (PVCs); vinyl acetate resins; poly(phenylene sulfide)s (PPSs); amide resins such as polyamides (nylons) and wholly aromatic polyamides (aramids); polyimide resins; and poly(ether ether ketone)s (PEEKs). Each of different materials can be used alone or in combination.

When used as the base material, a plastic base material may be controlled in deformation properties, such as elongation percentage, typically through a drawing treatment. When the monomer-absorptive layer is formed through curing by the action of active energy rays, the base material is preferably one that does not adversely affect the transmission of the active energy rays.

The surface of the base material may have been subjected to a common surface treatment, for increasing adhesion with the monomer-absorptive layer. Examples of such surface treatments include oxidizing treatments according to a chemical or physical procedure, such as corona treatment, chromate treatment, exposure to ozone, exposure to flame, exposure to a high-voltage electric shock, and treatment with ionizing radiation. The surface may also be subjected to a coating treatment with a primer or a release agent (e.g., silicone release agent).

In an embodiment, the surface of the base material has been subjected to a release treatment (parting treatment) with a release agent. The base material in this embodiment can be easily removed from the monomer-absorptive layer to expose the surface of the monomer-absorptive layer upon use of the viscoelastic article. The viscoelastic article as in this embodiment may be used while the surface of the monomer-absorptive layer is exposed.

The thickness of the base material is typically generally about 1000 µm or less (e.g., about from 1 to 1000 µm), preferably about from 1 to 500 µm, and more preferably about from 3 to 300 µm, though it is not critical and can be chosen as appropriate according typically to the strength, flexibility, and intended use. The base material may have a single-layer structure or multilayer structure.

[Cover Film]

In an embodiment of the present invention, a polymerizable composition layer containing an elastomer is provided on at least one side of the monomer-absorptive layer using a polymerizable composition containing the elastomer to thereby give a polymerizable composition layer containing the elastomer unevenly distributed; and the polymerizable composition layer containing the unevenly distributed elastomer is thereafter polymerized to form a polymer layer containing the elastomer unevenly distributed. In this embodiment, the surface of the polymerizable composition layer containing the unevenly distributed elastomer is preferably covered with a cover film during the polymerization of the polymerizable composition layer containing the unevenly distributed elastomer, so as to avoid adverse effects typically of oxygen in the atmosphere (air) on the reaction (polymerization). The resulting viscoelastic article may be used after removing the cover film therefrom or may be used as intact without removing the cover film. When the viscoelastic article is used without removing the cover film, the cover film is used as part of the viscoelastic article.

Though not limited, as long as being a thin article that blocks the entrance of oxygen, the cover film is preferably transparent when a photopolymerization reaction is adopted in the polymerization. For example, common release papers may be used as the cover film. Specifically, exemplary cover films usable herein include base materials having a releasably treated layer (releasable layer) with a release agent (parting agent) on at least one surface; low-adhesive base materials composed typically of any of fluorocarbon polymers (e.g., polytetrafluoroethylenes, polychlorotrifluoroethylenes, poly (vinyl fluoride)s, poly(vinylidene fluoride)s, tetrafluoroethylene-hexafluoropropylene copolymers, and chlorofluoroethylene-vinylidene fluoride copolymers); and low-adhesive base materials composed typically of nonpolar polymers including olefinic resins such as polyethylene and polypropylene. In this connection, the low-adhesive base materials can utilize both surfaces as release surfaces; in contrast, the base materials having a releasably treated layer or layers can utilize the releasably treated layer surface(s) as release surface(s) (releasably treated surface(s)).

The cover film may be a cover film including a cover-film base material and a releasably treated layer present on at least one side of the base material (i.e., a base material having a releasably treated layer) or may be a cover-film base material alone.

Exemplary cover-film base materials include plastic base films (synthetic resin films) such as polyester films (e.g., poly(ethylene terephthalate) films), olefinic resin films (e.g., polyethylene films and polypropylene films), poly(vinyl chloride) films, polyimide films, polyamide films (nylon films), and rayon films; papers (e.g., woodfree paper, Japanese paper, kraft paper, glassine paper, synthetic paper, and topcoat paper); and laminates (multilayer assemblies having two or three layers) of these materials prepared typically through lamination or coextrusion. Of the cover-film base materials, those using plastic base films having high transparency are preferred, of which those using poly(ethylene terephthalate) films are more preferred.

Examples of the release agent include, but are not limited to, silicone release agents, fluorine release agents, and long-chain alkyl release agents. Each of different release agents may be used alone or in combination. Such a cover film having been subjected to a release treatment with a release agent may be formed according typically to a known procedure.

Though not critical, the thickness of the cover film can be chosen within ranges of typically from 12 to 250 µm, and preferably from 20 to 200 µm, from the points of satisfactory handleability and economic efficiency. The cover film may have a single-layer structure or multilayer structure.

[Viscoelastic Articles]

Viscoelastic articles according to embodiments of the present invention are articles (members) each having at least a multilayer structure including a polymer layer, and a monomer-absorptive layer capable of absorbing at least one of monomer component(s) constituting the polymer layer, in which the polymer layer is a polymer layer containing an elastomer unevenly distributed (polymer layer containing a banded or segregated elastomer), where the' elastomer is unevenly distributed in the layer and enriched at an interface, or in the vicinity thereof, opposite to another interface with the monomer-absorptive layer.

The viscoelastic articles each have a polymer layer containing an elastomer being unevenly distributed in the layer and enriched at an interface, or in the vicinity thereof, opposite to another interface with the monomer-absorptive layer, i.e., a polymer layer containing the elastomer being unevenly and laminarly distributed. Accordingly, the elastomer concentrates in the laminar portion in the viscoelastic articles. This allows the viscoelastic articles to exert properties which the elastomer inherently has in the laminar portion where the elastomer concentrates and is enriched (elastomer-enriched portion).

In an embodiment, a viscoelastic article includes the polymer layer containing the unevenly distributed elastomer as an outermost layer. In this viscoelastic article, the polymer layer containing the unevenly distributed elastomer as the outermost layer is provided on the monomer-absorptive layer, and the surface of the article is covered by the elastomer-enriched portion of the polymer layer containing the unevenly distributed elastomer. Accordingly, the viscoelastic article having the polymer layer containing the unevenly distributed elastomer as the outermost layer exerts, on the surface of the viscoelastic article, properties which the elastomer inherently has.

According to an embodiment, such a viscoelastic article can be produced by providing a polymerizable composition layer containing an elastomer on at least one side of a monomer-absorptive layer using a polymerizable composition containing at least a polymerizable monomer and the elastomer; allowing the elastomer to migrate within the polymerizable composition layer containing the elastomer to give a polymerizable composition layer containing the elastomer, in which the elastomer is unevenly distributed in the layer and enriched at an interface, or in the vicinity thereof, opposite to another interface with the monomer-absorptive layer (layer surface or in the vicinity thereof); and thereafter carrying out polymerization of the polymerizable composition layer containing the unevenly distributed elastomer to form a polymer layer containing the elastomer unevenly distributed, to thereby yield a multilayer structure including the monomer-absorptive layer and the polymer layer containing the unevenly distributed elastomer.

According to another embodiment, a viscoelastic article can be produced by preparing a laminate, in which the laminate includes, in the following order, a monomer-absorptive sheet, a polymerizable composition layer containing an elastomer, and a cover film, the monomer-absorptive sheet has a monomer-absorptive layer with a monomer-absorptive face, the polymerizable composition layer is present on the monomer-absorptive face of the monomer-absorptive sheet (the surface of the monomer-absorptive layer of the monomer-absorptive sheet) and contains at least a polymerizable monomer and the elastomer, and the monomer-absorptive sheet is capable of absorbing the polymerizable, monomer; allowing the elastomer to migrate within the polymerizable composition layer containing the elastomer to give a polymerizable composition layer containing the elastomer, in which the elastomer is unevenly distributed in the layer and enriched in the layer surface, or the vicinity thereof, adjacent to the cover film (at an interface, or in the vicinity thereof, opposite to another interface with the monomer-absorptive layer); and carrying out polymerization of the polymerizable composition layer containing the unevenly distributed elastomer typically through photoirradiation and/or heating, to form a polymer layer containing the elastomer, in which the elastomer is unevenly distributed in the layer and enriched in the layer surface, or the vicinity thereof, adjacent to the cover film (at an interface, or in the vicinity thereof, opposite to another interface with the monomer-absorptive layer) to thereby yield a viscoelastic article having a multilayer structure including the monomer-absorptive layer and the polymer layer containing the unevenly distributed elastomer.

According to yet another embodiment, a viscoelastic article can be produced also by providing a polymerizable composition layer on at least one side of a monomer-absorptive layer, in which the polymerizable composition layer includes a polymerizable composition containing at least a polymerizable monomer, an elastomer, and a tackifier resin; whereby allowing the elastomer and the tackifier resin to migrate within the polymerizable composition layer to give a polymerizable composition layer containing the elastomer and the tackifier resin, in which the elastomer and the tackifier resin are both unevenly distributed in the layer and enriched at an interface, or in the vicinity thereof, opposite to another interface with the monomer-absorptive layer; and carrying out polymerization of the polymerizable composition layer to form a polymer layer containing the elastomer and the tackifier resin, in which the elastomer and the tackifier resin are both unevenly distributed in the layer and enriched at an interface, or in the vicinity thereof, opposite to another interface with the monomer-absorptive layer, to thereby yield a viscoelastic article having a multilayer structure including the monomer-absorptive layer and the polymer layer containing the elastomer and the tackifier resin both unevenly distributed.

According to still another embodiment, a viscoelastic article can be produced also by preparing a laminate, in which the laminate includes, in the following order, a monomer-absorptive sheet, a polymerizable composition layer, and a cover film, the monomer-absorptive sheet has a monomer-absorptive layer with a monomer-absorptive face, the polymerizable composition layer is present on the monomer-adhesive face of the monomer-absorptive sheet and includes a polymerizable composition containing at least a polymerizable monomer, an elastomer, and a tackifier resin, and the monomer-absorptive sheet is capable of absorbing the polymerizable monomer; allowing the elastomer and the tackifier resin to migrate within the polymerizable composition layer to give a polymerizable composition layer containing the elastomer and the tackifier resin, in which the elastomer and the tackifier resin are both unevenly distributed in the layer and enriched at an interface, or in the vicinity thereof, opposite to another interface with the monomer-absorptive layer; and carrying out polymerization of the polymerizable composition layer to form a polymer layer containing the elastomer and the tackifier resin, in which the elastomer and the tackifier resin are both unevenly distributed in the layer and enriched at an interface, or in the vicinity thereof, opposite to another interface with the monomer-absorptive layer, to thereby yield a viscoelastic article having a multilayer structure including the monomer-absorptive layer and the polymer layer containing the elastomer and the tackifier resin both unevenly distributed.

Accordingly, in another embodiment, a viscoelastic article may be produced typically through the steps of (i) preparing a specific laminate, and thereafter (ii) irradiating the specific laminate with light.

The specific laminate may be prepared typically by applying a polymerizable composition which is photopolymerizable and contains an elastomer (hereinafter also referred to as a "photopolymerizable composition containing the elastomer") to a cover film having a releasably treated surface as at least one of its surfaces, in which the photopolymerizable composition is applied to the releasably treated surface, to form a photopolymerizable composition layer containing the elastomer thereon to give an assembly; and affixing the assembly to a monomer-absorptive sheet having a monomer-absorptive layer so that the photopolymerization composition layer containing the elastomer is in contact with the monomer-absorptive layer.

Conditions for the polymerization of the polymerizable composition layer containing the unevenly distributed elastomer are not especially limited, as long as the polymerizable composition layer containing the unevenly distributed elastomer is polymerized/cured to give a polymer layer containing the elastomer unevenly distributed. Exemplary conditions herein include type of light source or heat source; irradiation energy or heat energy; irradiation procedure or heating procedure; irradiation duration or heating duration; starting timing of irradiation or heating; and ending timing of irradiation or heating.

Exemplary photoirradiation procedures include irradiation with ultraviolet rays typically using a black-light lamp, chemical lamp, high-pressure mercury lamp, or metal halide lamp. Exemplary heating procedures include known heating procedures such as heating with an electric heater or heating using electromagnetic waves such as infrared rays.

Typically, a viscoelastic article according to an embodiment of the present invention may be produced by photoirradiating the specific laminate containing a polymerizable monomer with active energy rays such as ultraviolet rays. The specific laminate herein is a specific laminate including a releasable cover film, a photopolymerizable composition layer containing an elastomer, and a monomer-absorptive sheet, in which the photopolymerizable composition layer containing the elastomer is provided on the monomer-absorptive face of the monomer-absorptive sheet and is protected on its surface by the releasable cover film.

The absorption of the polymerizable monomer by the monomer-absorptive layer occurs or begins at the time when the polymerizable composition layer containing the elastomer is formed or provided on the monomer-absorptive face of the monomer-absorptive layer. The absorption may also occur during a duration from the formation of the polymerizable composition layer containing the elastomer to the polymerization of the layer (e.g., during a duration from the preparation of the specific laminate to the photoirradiation of the laminate) and/or may occur during the polymerization of the photopolymerization composition layer containing the elastomer (e.g., during the curing of the photopolymerizable composition layer containing the elastomer through photoirradiation).

Accordingly, the longer the time period from the contact of the polymerizable composition layer containing the elastomer with the monomer-absorptive layer to the completion of polymerization is, the better. In particular, when the start of polymerization can be easily controlled by the timing of photoirradiation, the photoirradiation is performed after a lapse of preferably 1 second or longer, more preferably 5 seconds or longer, and furthermore preferably 10 seconds or longer (generally within 24 hours) from the contact.

In the viscoelastic article, the elastomer is distributed and enriched in the surface or the vicinity thereof (at an interface, or in the vicinity thereof, opposite to another interface with the monomer-absorptive layer) in the polymer layer containing the unevenly distributed elastomer. Specifically, the elastomer is distributed and enriched in a region ranging from the surface (at an interface opposite to the other interface with the monomer-absorptive layer) or layer surface (at an interface opposite to the other interface with the monomer-absorptive layer) and occupying, in a thickness direction, 50% or less (preferably occupying 35% or less, and more preferably occupying 25% or less) of the total thickness. In other words, the proportion of the elastomer-enriched portion occupying in the multilayer structure (overall thickness) including the monomer-absorptive layer and the polymer layer containing the unevenly distributed elastomer in the viscoelastic article is 50% or less, preferably 35% or less, and more preferably 25% or less (this proportion is hereinafter also referred to as "occupancy"). This is probably because, when the polymerizable composition layer containing the elastomer to form a polymer layer containing the elastomer unevenly distributed is provided so as to be in contact with the monomer-absorptive layer, at least one of monomer component(s) is absorbed by the monomer-absorptive layer from the polymerizable composition layer containing the elastomer, and this allows the elastomer to migrate within the photopolymerizable composition layer containing the elastomer.

If the occupancy is more than 50%, the viscoelastic article may suffer from problems in its strength, handleability, and cost. Above all, the handleability problems may significantly occur when the viscoelastic article is in the form of a tape or sheet.

The thickness of a portion where the elastomer is distributed and enriched (elastomer-enriched portion or elastomer-banded portion) in the polymer layer containing the unevenly distributed elastomer can be controlled by modifying the amount of the elastomer to be contained in the polymer layer. Accordingly, to which extent the polymer layer containing the unevenly distributed elastomer exerts properties which the elastomer inherently has can be controlled by modifying the amount of the elastomer to be used. As used herein the "thickness" of the portion refers to a height of the inner region enriched with the elastomer in a thickness direction from the layer surface, with respect to the total thickness in a thickness direction from the layer surface; or the "thickness" refers to a height of the inner region enriched with the elastomer in a thickness direction from the interface opposite to the monomer-absorptive layer, with respect to the total thickness in a thickness direction from the interface opposite to the monomer-absorptive layer.

Though not critical, the thicknesses of the viscoelastic articles are generally from 10 to 2000 μm, preferably from 20 to 1000 μm, and more preferably from 30 to 500 μm, from the viewpoints typically of handleability and cost.

Also though not critical, the total thickness of the monomer-absorptive layer and the polymer layer containing the unevenly distributed elastomer in the viscoelastic article (the thickness of the multilayer structure including the monomer-absorptive layer and the polymer layer containing the unevenly distributed elastomer; hereinafter also referred to as "overall thickness") is generally from 10 to 2000 μm, preferably from 20 to 1000 μm, and more preferably from 30 to 500 μm. A viscoelastic article, if having an overall thickness of less than 10 μm may be difficult to be controlled in its thickness through coating and/or may have poor handleability. In particular, the handleability problem may significantly occur when the viscoelastic article is in the form of a tape or sheet. In contrast, a viscoelastic article, if having an overall thickness of more than 2000 μm, may be difficult to produce. In particular, the production problem may significantly occur when the viscoelastic article is in the form of a tape or sheet.

In the elastomer-enriched portion, where the elastomer is distributed and enriched, in the polymer layer containing the unevenly distributed elastomer in the viscoelastic articles, the elastomer is coexistent with the polymer component(s) of the polymer layer. The portion where the elastomer is distributed and enriched (elastomer-enriched portion) can be distinguished from a portion where the elastomer is not enriched (this portion is hereinafter also referred to as a "portion where the elastomer is sparse") in the polymer layer containing the unevenly distributed elastomer in the viscoelastic articles, because the elastomer-enriched portion is present in the form of a layer.

The elastomer may be distributed and dispersed in a trace amount in such a portion where the elastomer is sparse, in some combinations of the monomer absorptive layer and the polymerizable monomer to be used. However, the elastomer dispersed in a trace amount in the portion where the elastomer is sparse does not affect the properties of the viscoelastic articles. This is because the viscoelastic articles do not exert properties which the elastomer inherently has unless the elastomer concentrates and is present densely.

The proportion of the portion where the elastomer is sparse in the polymer layer containing the unevenly distributed elastomer of the viscoelastic articles is 30% or more, preferably 50% or more, and more preferably 60% or more. This proportion is hereinafter also referred to as "segregation percentage". If the segregation percentage is less than 30%, the elastomer may neither concentrate nor be present densely in the elastomer-enriched portion, and whereby the properties which the elastomer inherently has may not be exerted satisfactorily.

Though not critical, the average thickness of the elastomer-enriched portion of the polymer layer containing the unevenly distributed elastomer is preferably such a thickness as to allow the viscoelastic article to have an occupancy within the above-mentioned range. Specifically, the average thickness may be from 0.1 to 200 μm, preferably from 0.5 to 100 μm, and more preferably from 1 to 50 μm.

To which extent the viscoelastic articles exert the properties which the elastomer inherently has can be controlled by controlling conditions and parameters such as the type and content of the elastomer; the formulation of the monomer-absorptive layer, the formulation of polymer components constituting the polymer layer containing the unevenly distributed elastomer, and other formulations; and the thickness (overall thickness) of the monomer-absorptive layer and the polymer layer containing the unevenly distributed elastomer in the viscoelastic articles.

Herein a comparison is made between a polymer layer containing an unevenly distributed elastomer and a polymer layer containing an elastomer being spread (polymer layer containing the elastomer being spread in a thickness direction), in which the two polymer layers are in common with each other in the layer thickness, the type and content of the elastomer, and the monomer components. As a result, the polymer layer containing the unevenly distributed elastomer exerts the properties which the elastomer inherently has to a more extent than the polymer layer containing the spread elastomer does. Independently, another comparison is made between a polymer layer containing an elastomer unevenly distributed and a polymer layer containing an elastomer being spread, in which the two polymer layers are in common with each other in the layer thickness, the type of the elastomer, and the monomer components. As a result, the polymer layer containing the unevenly distributed elastomer exerts the properties which the elastomer inherently has at such a small content of the elastomer that the polymer layer containing the spread elastomer does not develop the properties which the elastomer inherently has. This is because the polymer layer containing the unevenly distributed elastomer has an elastomer-enriched portion in the form of a layer where the elastomer concentrates and is enriched.

The viscoelastic articles according to embodiments of the present invention each have such a polymer layer containing an elastomer unevenly distributed, thereby develop properties which the elastomer inherently has at a small content of the elastomer, and have satisfactory mechanical properties.

In such viscoelastic articles according to embodiments of the present invention, one surface is provided by the elastomer-enriched portion and the other surface is provided by a polymer, whereby the two surfaces showing different properties from each other, in the polymer layer containing the unevenly distributed elastomer or the multilayer structure including a monomer-absorptive polymer layer serving as the monomer-absorptive layer, and the polymer layer containing the unevenly distributed elastomer. The viscoelastic articles are therefore usable in various applications such as applications where the viscoelastic articles are each used as an adhesive layer to join or bond two or more articles composed of different materials [e.g., applications to bond a plastic or another nonpolar material with a metal or another polar material by using a styrenic elastomer as the elastomer [the styrenic elastomer and a tackifier resin (rubber pressure-sensitive adhesive)] and using an acrylic polymer (acrylic pressure-sensitive adhesive) as the polymer]; applications in which one surface should have flexibility, and the other surface should have hardness; applications in which one surface should have adhesiveness, and the other surface should have flexibility; applications in which one surface should have hydrophilicity, and the other surface should have hydrophobicity; applications in which one surface should have thermal stability, and the other surface should have thermofusibility (hot-melt properties).

As has been described, according to an embodiment of the present invention, a viscoelastic article having a polymer layer containing an elastomer unevenly distributed can be produced, even though using a polymerizable composition containing the elastomer, without the need of evaporation and removal of volatile components (e.g., components, such as solvents and organic compounds, which adversely affect the environment).

The elastic modulus of the monomer-absorptive layer is not critical herein, because the monomer-absorptive layer is not limited, as long as the monomer-absorptive layer is capable of absorbing at least one of polymerizable monomer(s) used in the polymerizable composition containing the elastomer. Specifically, the monomer-absorptive layer can be one having any elastic modulus, as long as the monomer-absorptive layer is capable of absorbing at least one of polymerizable monomer(s) used in the polymerizable composition containing the elastomer. Exemplary monomer-absorptive layers having various elastic moduli include those having low elastic moduli, such as pressure-sensitive adhesive layer and polymer layer; and those having high elastic moduli, such as plastic sheet, hard coat layer, and colored coat layer. A viscoelastic article according to the present invention can therefore be produced using any sheet (monomer-absorptive layer) without being restricted by the elastic modulus of the sheet. Examples of such sheets having various elastic moduli include those having low elastic moduli, such as a pressure-sensitive adhesive layer and a polymer layer; and those having low elastic moduli, such as plastic sheet, hard coat layer, and colored coat layer.

In an embodiment, a monomer-absorptive polymer layer including a polymer is used as the monomer-absorptive layer. In this embodiment, the gel fraction of the monomer-absorptive polymer layer is not especially limited, as long as the layer is capable of absorbing at least one of polymerizable monomer(s) used in the polymerizable composition containing the elastomer. A viscoelastic article can therefore be produced, regardless of whether the monomer-absorptive polymer layer has been crosslinked to a gel fraction of about 98% or has been crosslinked substantially sparsely (to a gel fraction of 10% or less).

A viscoelastic article using a polymer layer having a high degree of crosslinking (e.g., with a gel fraction of 90% or more) as the monomer-absorptive layer can exert, for example, thermal stability and/or solvent resistance in the polymer layer as the monomer-absorptive layer.

In contrast, a viscoelastic article using a polymer layer having a low degree of crosslinking (e.g., with a gel fraction of 10% or less) as the monomer-absorptive layer is controllable in extent of exerting the properties which the elastomer inherently has.

In addition, a viscoelastic article can be produced according to the present invention regardless of whether the monomer-absorptive layer is a hard (rigid) layer or soft (flexible) layer.

As has been described, viscoelastic articles according to embodiments of the present invention are usable in a wide variety of fields, because the viscoelastic articles exert various characteristic properties by controlling conditions and parameters such as the type and amount of the elastomer; and the polymer type and thickness of the polymer layer containing the unevenly distributed elastomer.

EXAMPLES

The present invention will be illustrated in further detail with reference to several working examples below. It should be noted, however, that these examples are never construed to limit the scope of the present invention.

Preparation Example 1 of Photopolymerizable Syrup

In a four-necked flask equipped with a stirrer, a thermometer, a nitrogen gas inlet tube, and a condenser, were stirred 90 parts by weight of 2-ethylhexyl acrylate and 10 parts by weight of acrylic acid as monomer components, 0.05 part by weight of a photoinitiator (trade name "IRGACURE 651" supplied by Ciba Specialty Chemicals Corporation), and 0.05 part by weight of another photoinitiator (trade name "IRGACURE 184" supplied by Ciba Specialty Chemicals Corporation), to give a homogeneous mixture. The mixture was subjected to bubbling with nitrogen gas for 1 hour to remove dissolved oxygen therefrom. The mixture was thereafter polymerized through irradiation with ultraviolet rays from the outside of the flask using a high-pressure mercury lamp, and at the time when the mixture had a suitable viscosity, the lamp was turned out and the nitrogen blowing was stopped to give a composition (syrup) having a degree of polymerization of 7% and having been partially polymerized (hereinafter also referred to as a "photopolymerizable syrup (A)").

Preparation Example 1 of Polymerizable Composition Containing Elastomer

A monomer mixture containing 90 parts by weight of 2-ethylhexyl acrylate and 10 parts by weight of acrylic acid was combined with 22.5 parts by weight of a styrene-ethylene/butylene block copolymer (SEBS) (trade name "KRATON G1650" supplied by Kraton Polymers Japan Ltd.), followed by stirring at 60° C. for 6 hours to completely dissolve SEBS. After cooling to room temperature (25° C.), the resulting viscous monomer mixture was combined with 0.3 part by weight of a photoinitiator (trade name "IRGACURE 651" supplied by Ciba Specialty Chemicals Corporation), 4.5 parts by weight of a hydrogenated petroleum resin (trade name "ARKON P115" supplied by Arakawa Chemical Industries, Ltd.) as a tackifier resin, and 0.1 part by weight of 1,6-hexanediol diacrylate as a crosslinking agent, followed by stirring to give, as a homogeneous mixture, a polymerizable composition containing an elastomer (hereinafter also referred to as a "polymerizable composition (A) containing the elastomer").

Preparation Example 2 of Polymerizable Composition Containing Elastomer

A monomer mixture containing 90 parts by weight of 2-ethylhexyl acrylate and 10 parts by weight of acrylic acid was combined with 22.5 parts by weight of a styrene-ethylene/butylene block copolymer (SEBS) (trade name "KRATON G1650" supplied by Kraton Polymers Japan Ltd.), followed by stirring at 60° C. for 6 hours to completely dissolve SEBS. After cooling to room temperature (25° C.), the resulting viscous monomer mixture was further combined with 0.3 part by weight of a photoinitiator (trade name "IRGACURE 651" supplied by Ciba Specialty Chemicals Corporation), 11 parts by weight of a hydrogenated petroleum resin (trade name "ARKON P115" supplied by Arakawa Chemical Industries, Ltd.) as a tackifier resin, and 0.1 part by weight of 1,6-hexanediol diacrylate as a crosslinking agent, followed by stirring to give, as a homogeneous mixture, a polymerizable composition containing an elastomer (hereinafter also referred to as a "polymerizable composition (B) containing the elastomer").

Preparation Example 3 of Polymerizable Composition Containing Elastomer

A monomer mixture containing 90 parts by weight of 2-ethylhexyl acrylate and 10 parts by weight of acrylic acid was combined with 22.5 parts by weight of a styrene-ethylene/butylene block copolymer (SEBS) (trade name "KRA- TON G1650" supplied by Kraton Polymers Japan Ltd.), followed by stirring at 60° C. for 6 hours to completely dissolve SEBS. After cooling to room temperature (25° C.), the resulting viscous monomer mixture was further combined with 0.3 part by weight of a photoinitiator (trade name "IRGACURE 651" supplied by Ciba Specialty Chemicals Corporation), 22.5 parts by weight of a hydrogenated petroleum resin (trade name "ARKON P115" supplied by Arakawa Chemical Industries, Ltd.) as a tackifier resin, and 0.1 part by weight of 1,6-hexanediol diacrylate as a crosslinking agent, followed by stirring to give, as a homogeneous mixture, a polymerizable composition containing an elastomer (hereinafter also referred to as a "polymerizable composition (C) containing the elastomer".

Preparation Example 4 of Polymerizable Composition Containing Elastomer

A monomer mixture containing 90 parts by weight of 2-ethylhexyl acrylate and 10 parts by weight of acrylic acid was combined with 22.5 parts by weight of a styrene-butadiene block copolymer (SBS) (trade name "KRATON D1101" supplied by Kraton Polymers Japan Ltd.), followed by stirring at 60° C. for 6 hours to completely dissolve SBS. After cooling to room temperature (25° C.), the resulting viscous monomer mixture was further combined with 0.3 part by weight of a photoinitiator (trade name "IRGACURE 651" supplied by Ciba Specialty Chemicals Corporation), 11 parts by weight of a hydrogenated petroleum resin (trade name "ARKON P115" supplied by Arakawa Chemical Industries, Ltd.) as a tackifier resin, and 0.1 part by weight of 1,6-hexanediol diacrylate as a crosslinking agent, followed by stirring to give, as a homogeneous mixture, a polymerizable composition containing an elastomer (hereinafter also referred to as a "polymerizable composition (D) containing the elastomer").

Preparation Example 5 of Polymerizable Composition Containing Elastomer

A monomer mixture containing 90 parts by weight of 2-ethylhexyl acrylate and 10 parts by weight of acrylic acid was combined with 22.5 parts by weight of a styrene-isoprene block copolymer (SIS) (trade name "KRATON D1107" supplied by Kraton Polymers. Japan Ltd.), followed by stirring at 60° C. for 6 hours to completely dissolve SBS. After cooling to room temperature (25° C.), the resulting viscous monomer mixture was further combined with 0.3 part by weight of a photoinitiator (trade name "IRGACURE 651" supplied by Ciba Specialty Chemicals Corporation), 11 parts by weight of a hydrogenated petroleum resin (trade name "ARKON P115" supplied by Arakawa Chemical Industries, Ltd.) as a tackifier resin, and 0.1 part by weight of 1,6-hexanediol diacrylate as a crosslinking agent, followed by stirring to give, as a homogeneous mixture, a polymerizable composition containing an elastomer (hereinafter also referred to as a "polymerizable composition (E) containing the elastomer").
(Cover Film)
A cover film used herein was a biaxially oriented poly (ethylene terephthalate) film (trade name "MRN38" supplied by Mitsubishi Polyester Film GmbH (Mitsubishi Plastics, Inc.)) having a thickness of 38 μm, one surface of which had been treated with a silicone release agent.
(Base Film)
A base film used herein was a biaxially oriented poly (ethylene terephthalate) film (trade name "MRF38" supplied by Mitsubishi Polyester Film GmbH (Mitsubishi Plastics, Inc.)) having a thickness of 38 μm, one surface of which had been treated with a silicone release agent.

Preparation Example 1 of Supported Monomer-Absorptive Sheet

A photopolymerizable syrup composition (hereinafter also referred to as a "photopolymerizable syrup composition (A)") was prepared by homogeneously mixing 100 parts by weight of the photopolymerizable syrup (A) with 0.1 part by weight of 1,6-hexanediol diacrylate. The photopolymerizable syrup composition was applied to the releasably treated surface of the base film to form a photopolymerizable syrup composition layer so as to have a thickness after curing of 30 μm. The cover film was applied to the formed layer so that the releasably treated surface of the cover film was in contact with the layer; and the both sides of the resulting article were irradiated simultaneously with ultraviolet rays (illuminance: 5 mW/cm$^2$) using a black-light lamp for 5 minutes to cure the layer to thereby form a monomer-absorptive layer. Thus, a supported monomer-absorptive sheet where the surface of the monomer-absorptive layer was protected by the cover film was prepared (this sheet is hereinafter also referred to as a "supported monomer-absorptive sheet (A)").

Examples 1 to 5

A polymerizable composition containing the elastomer as given in Table 1 below was applied to the releasably treated surface of the cover film so that the overall thickness of the monomer-absorptive layer and a photo-polymerized/cured layer containing the elastomer in the resulting article be about 80 μm and thereby yielded a series of sheets each including the cover film and the polymerizable composition layer containing the elastomer present on the cover film.

The cover film was removed from the supported monomer-absorptive sheet (A) to expose the monomer-absorptive layer, and the exposed monomer-absorptive layer was applied to each of the above-prepared sheets including the cover film and the polymerizable composition layer containing the elastomer present on the cover film, so that the monomer-absorptive layer was in contact with the polymerizable composition layer containing the elastomer, and thereby yielded a series of laminates.

One minute after the formation of the laminates, both sides of each laminate were irradiated simultaneously with ultraviolet rays (illuminance: 5 mW/cm$^2$) from a black-light lamp as a light source for 5 minutes to cure the polymerizable composition layer containing the elastomer to thereby form a photo-polymerized/cured layer containing the elastomer (elastomer-containing photo-polymerized/cured layer). Thus, a series of articles according to the examples was prepared.

TABLE 1

| | Polymerizable composition containing elastomer |
|---|---|
| Example 1 | A |
| Example 2 | B |
| Example 3 | C |
| Example 4 | D |
| Example 5 | E |

Comparative Example 1

An article was prepared by the procedure of Example 1, except for applying the polymerizable composition containing the elastomer so that the photo-polymerized/cured layer containing the elastomer after the preparation of the article have a thickness of 50 µm, and except for using the base film instead of the supported monomer-absorptive sheet (A).

Comparative Example 2

An article was prepared by the procedure of Example 2, except for applying the polymerizable composition containing the elastomer so that the photo-polymerized/cured layer containing the elastomer after the preparation of the article have a thickness of 50 µm, and except for using the base film instead of the supported monomer-absorptive sheet (A).

Comparative Example 3

An article was prepared by the procedure of Example 3, except for applying the polymerizable composition containing the elastomer so that the photo-polymerized/cured layer containing the elastomer after the preparation of the article have a thickness of 50 µm, and except for using the base film instead of the supported monomer-absorptive sheet (A).

Comparative Example 4

An article was prepared by the procedure of Example 4, except for applying the polymerizable composition containing the elastomer so that the photo-polymerized/cured layer containing the elastomer after the preparation of the article have a thickness of 50 µm, and except for using the base film instead of the supported monomer-absorptive sheet (A).

Comparative Example 5

An article was prepared by the procedure of Example 5, except for applying the polymerizable composition containing the elastomer so that the photo-polymerized/cured layer containing the elastomer after the preparation of the article have a thickness of 50 µm, and except for using the base film instead of the supported monomer-absorptive sheet (A).

(Evaluation 1)

On the articles according to the examples and comparative examples, the adhesive strengths of the surface of the photo-polymerized/cured layer containing the elastomer and of the surface of the monomer-absorptive layer with respect to respective adherends, the total light transmissions, and the hazes of the articles were measured by the following "Method for Measuring Adhesive Strength of Article on Surface of Photo-Polymerized/Cured Layer Containing Elastomer", "Method for Measuring Adhesive Strength of Article on Surface of Monomer-Absorptive Layer", and "Method for Measuring Total Light Transmission and Haze". Independently, the staining and appearances of the articles were evaluated by the following "Method for Evaluating Staining" and "Method for Evaluating Appearance of Article". The results of these measurements and evaluations are shown in Table 2.

(Method for Measuring Adhesive Strength of Article on Surface of Photo-Polymerized/Cured Layer Containing Elastomer)

Initially, a test sample was prepared by removing the base film of the supported monomer-absorptive sheet from a sample article to expose a surface, and applying the exposed surface to a biaxially oriented poly(ethylene terephthalate) film (trade name "Lumirror S10" supplied by Toray Industries Inc.) 38 µm thick, and the resulting laminate was cut to a piece 20 mm wide and 150 mm long.

A 180-degree peel strength as an adhesive strength of the test sample was measured by removing the cover film from the test sample to expose the surface of the photo-polymerized/cured layer containing the elastomer; affixing the exposed surface to an adherend [a polypropylene plate (PP plate) or stainless steel plate (SUS plate)] at an ambient temperature of 23° C. by compression bonding through one reciprocating movement of a 5-kg roller; aging the resulting article at 23° C. for 30 minutes; and peeling the test sample from the adherend at an ambient temperature of 23° C. using a tensile tester (trade name "TCM-1kNB" supplied by Minebea Co., Ltd.) at a tensile speed of 300 mm per minute and a peel angle of 180 degrees.

(Method for Measuring Adhesive Strength of Article on Surface of Monomer-Absorptive Layer)

Initially, a test sample was prepared by removing the cover film from a sample article to expose a surface; applying the exposed surface to a biaxially oriented poly(ethylene terephthalate) film (trade name "Lumirror S10" supplied by Toray Industries Inc.) 38 µm thick; and cutting the resulting laminate to a piece 20 mm wide and 150 mm long.

A 180-degree peel strength as an adhesive strength of the test sample was measured by removing the base film of the supported monomer-absorptive sheet from the sample to expose the surface of the monomer-absorptive layer; affixing the exposed surface to an adherend [a polypropylene plate (PP plate) or stainless steel plate (SUS plate)] at an ambient temperature of 23° C. by compression bonding through one reciprocating movement of a 5-kg roller; aging the resulting article at 23° C. for 30 minutes; and peeling the test sample from the adherend at an ambient temperature of 23° C. using a tensile tester (trade name "TCM-1kNB" supplied by Minebea Co., Ltd.) at a tensile speed of 300 mm per minute and a peel angle of 180 degrees.

(Method for Evaluating Staining)

The adherend (polypropylene plate or stainless steel plate) after the completion of the measurement of the adhesive strength of the article on the surface of the photo-polymerized/cured layer containing the elastomer, and the adherend (polypropylene plate or stainless steel plate) after the completion of measurement of the adhesive strength of the article on the surface of the monomer-absorptive layer were visually observed. A sample article was evaluated as being less staining ("No staining") when the adherend showed no stain (such as white stain as adhesive deposit); and a sample article was evaluated as being more staining ("Staining") when the adherend showed any stain.

(Method for Evaluating Appearance of Article)

The cover film was removed from each article according to the examples and comparative examples to expose the photo-polymerized/cured layer containing the elastomer, and the article was visually observed from the exposed photo-polymerized/cured layer containing the elastomer side. A sample article was evaluated as being "Transparent" when the article showed no turbidity and was transparent; and a sample article was evaluated as being "Cloudy" when the article was cloudy.

(Method for Measuring Total Light Transmission and Haze)

A test sample was prepared by removing the cover film from a sample article to expose the photo-polymerized/cured layer containing the elastomer. The total light transmission and haze of the test sample were measured from the surface of the photo-polymerized/cured layer containing the elastomer with a turbidimeter (trade name "Haze Meter HM-150" supplied by Murakami Color Research Laboratory) according to Japanese Industrial Standards (JIS) K 7361 and JIS K 7136.

The measurements were performed three times per sample, and the three measured data were averaged to give the total light transmission and haze of the sample article, respectively.

ness of a sample article, and subtracting the thickness of the base film of the supported monomer-absorptive sheet and the thickness of the cover film from the thickness of the article

TABLE 2

|  | Adhesive strength [N/20 mm] | | | | Staining | | | | | Total light trans- mission [%] | Haze [%] |
|---|---|---|---|---|---|---|---|---|---|---|---|
|  | Surface of photo-polymerized/cured layer containing elastomer | | Surface of monomer-absorptive layer | | Surface of photo-polymerized/cured layer containing elastomer | | Surface of monomer-absorptive layer | | Appearance | | |
|  | PP plate | SUS plate | PP plate | SUS plate | PP plate | SUS plate | PP plate | SUS plate | | | |
| Example 1 | 5.8 | 3.0 | 2.8 | 9.6 | No staining | No staining | No staining | No staining | Transparent | 86 | 4.5 |
| Example 2 | 8 | 5.4 | 1.3 | 9.2 | No staining | No staining | No staining | No staining | Transparent | 86 | 4.5 |
| Example 3 | 5.8 | 7.0 | 1.2 | 9.2 | No staining | No staining | No staining | No staining | Transparent | 86 | 4.2 |
| Example 4 | 6 | 8.0 | 1.0 | 10.0 | No staining | No staining | No staining | No staining | Transparent | 86 | 4.1 |
| Example 5 | 6.2 | 6.0 | 1.0 | 9.6 | No staining | No staining | No staining | No staining | Transparent | 86 | 4.1 |
| Com. Ex. 1 | 2.2 | 8.8 | — | — | Staining | Staining | Staining | Staining | Cloudy | 84 | 14.4 |
| Com. Ex. 2 | 3.0 | 10.6 | — | — | Staining | Staining | Staining | Staining | Cloudy | 83 | 8.2 |
| Com. Ex. 3 | 4.0 | 12.6 | — | — | Staining | Staining | Staining | Staining | Cloudy | 83 | 7.4 |
| Com. Ex. 4 | 4.8 | 8.6 | — | — | Staining | Staining | Staining | Staining | Cloudy | 84 | 5.5 |
| Com. Ex. 5 | 4.0 | 8.0 | — | — | Staining | Staining | Staining | Staining | Cloudy | 85 | 4.4 |

(Evaluation 2)

Figure 2:
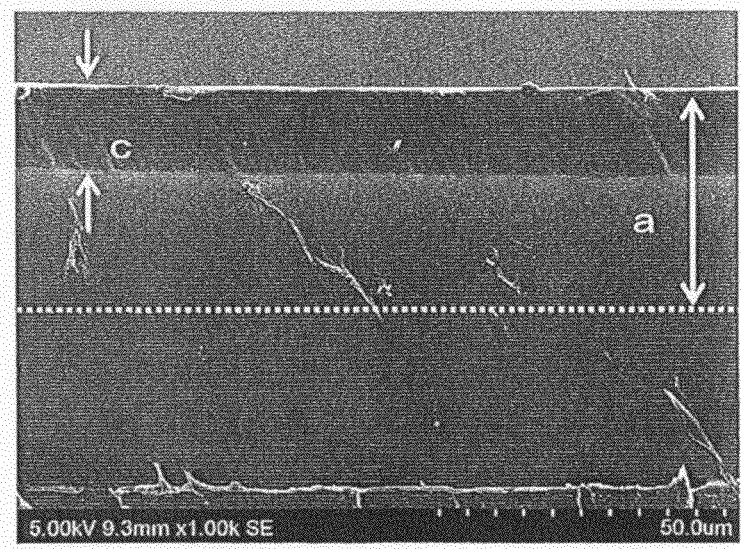
FIG. 2 is a scanning electron micrograph of a cross section of an article according to Example 2.
Figure 3:
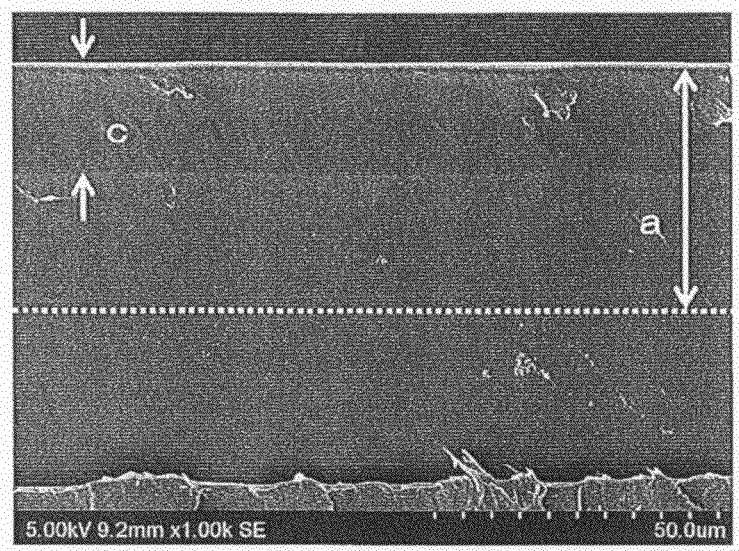
FIG. 3 is a scanning electron micrograph of a cross section of an article according to Example 3.
Figure 4:
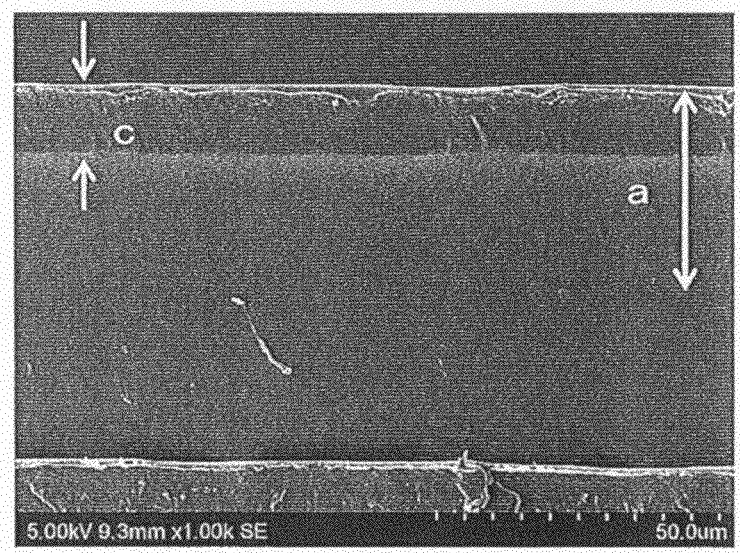
FIG. 4 is a scanning electron micrograph of a cross section of an article according to Example 4.
Figure 5:
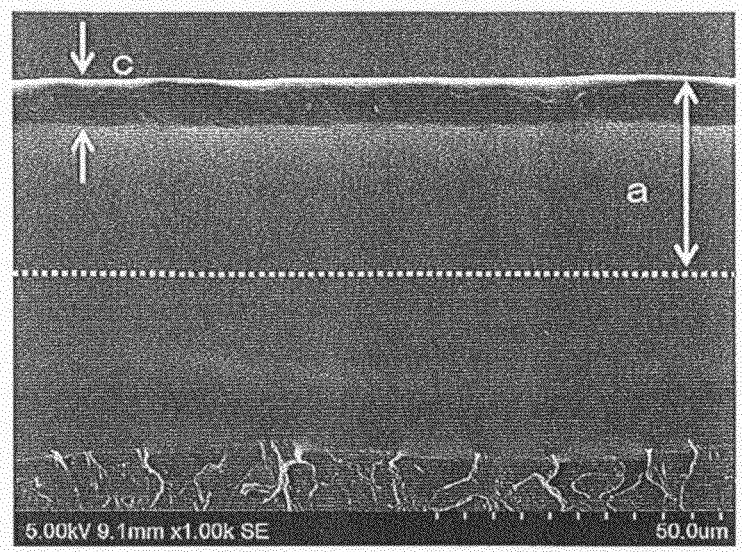
FIG. 5 is a scanning electron micrograph of a cross section of an article according to Example 5.
Figure 6:
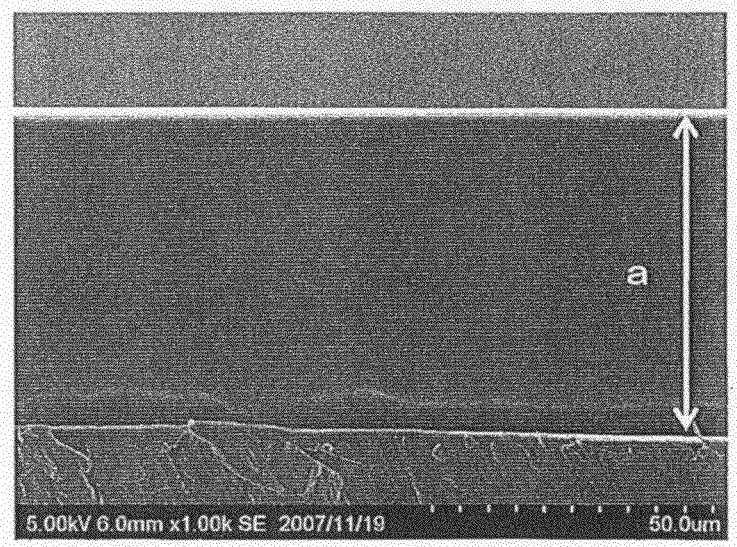
FIG. 6 is a scanning electron micrograph of a cross section of an article according to Comparative Example 2.
Figure 7:
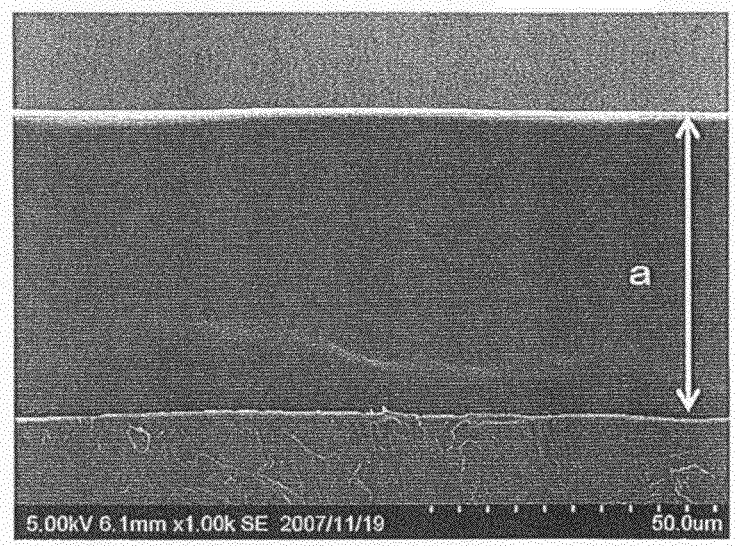
FIG. 7 is a scanning electron micrograph of a cross section of an article according to Comparative Example 4.
Figure 8:
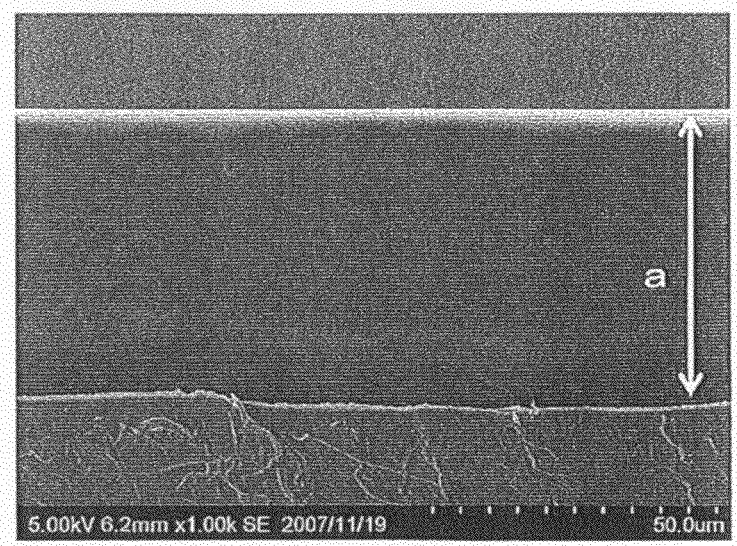
FIG. 8 is a scanning electron micrograph of a cross section of an article according to Comparative Example 5.

The cross sections of the respective articles, from which the cover film had been removed, were observed with a scanning electron microscope (SEM). The SEM used herein was S-3400N supplied by Hitachi High-Technologies Corporation. The scanning electron micrographs (SEM images) of the cross sections of the articles are shown in FIGS. 1 to 8. In these figures, the scanning electron micrographs of the cross sections of the articles were taken at magnifications of 1000 times. In the respective figures, the reference symbols "a" stands for an photo-polymerized/cured layer containing an elastomer; and "c" stands for an elastomer-enriched portion in a photo-polymerized/cured layer containing an elastomer.

(Evaluation 3)

The thickness (thickness A) of the photo-polymerized/cured layer containing the elastomer, the thickness (thickness B) of the monomer-absorptive layer, and the thickness (thickness C) of a portion where the elastomer is enriched (elastomer-enriched portion or elastomer-banded portion) in the photo-polymerized/cured layer containing the elastomer were determined by observing the cross section of each article with a scanning electron microscope (SEM) and by measuring the thickness of the supported monomer-absorptive sheet and the thickness of each article with a 1/1000 dial gauge. The determined thicknesses are shown in "Thickness A", "Thickness B", and "Thickness C", respectively, in Table 3. The segregation percentage and occupancy of each article were determined according to "Method for Determining Segregation Percentage" and "Method for Determining Occupancy" mentioned below, and the measured data are shown in "Segregation Percentage" and "Occupancy" in Table 3, respectively.

The thickness (thickness B) of the monomer-absorptive layer was determined by measuring the thickness of the supported monomer-absorptive sheet (i.e., the total thickness of the base film, monomer-absorptive layer, and cover film), and subtracting the thickness of the base film and the thickness of the cover film from the total thickness of the supported monomer-absorptive sheet.

Independently, the thickness (thickness A+B; overall thickness) of the multilayer structure including the monomer-absorptive layer and the photo-polymerized/cured layer containing the elastomer was determined by measuring the thickness of a sample article, and subtracting the thickness of the base film of the supported monomer-absorptive sheet and the thickness of the cover film from the thickness of the article (i.e., the total thickness of the supported monomer-absorptive sheet, the photo-polymerized/cured layer containing the elastomer, and the cover film).

The thickness (thickness A) of the photo-polymerized/cured layer containing the elastomer was determined by subtracting the thickness (thickness B) of the monomer-absorptive layer from the overall thickness (thickness A+B).

The thickness (thickness A) of the photo-polymerized/cured layer containing the elastomer was not a measured value but a theoretical value.

The height (thickness; thickness C) of the portion where the elastomer is enriched (elastomer-enriched portion or elastomer-banded portion) in the photo-polymerized/cured layer containing the elastomer ranging in a thickness direction from the surface of the photo-polymerized/cured layer containing the elastomer was determined based on the scanning electron micrograph of the cross section of the article taken with a scanning electron microscope.

The thickness of the elastomer-enriched portion in the photo-polymerized/cured layer containing the elastomer was an average thickness as measured based on the scanning electron micrograph of the cross section of the article taken with a scanning electron microscope.

(Method for Determining Segregation Percentage)

The segregation percentage of the photo-polymerized/cured layer containing the elastomer was determined by calculation according to the following equation:

$$\text{Segregation percentage (\%)} = (1 - C/A) \times 100$$

(Method for Determining Occupancy)

The occupancy was determined by calculation according to the following equation, in which the occupancy is the proportion in a depth direction (thickness direction) of the elastomer-enriched portion with respect to the thickness (thickness A+B, overall thickness) of the multilayer structure including the monomer-absorptive layer and the photo-polymerized/cured layer containing the elastomer, and the portion ranges from the surface of the photo-polymerized/cured layer.

$$\text{Occupancy (\%)} = C/(A+B) \times 100$$

TABLE 3

|  | Examples | | | | | Comparative Examples | | | | |
|---|---|---|---|---|---|---|---|---|---|---|
|  | 1 | 2 | 3 | 4 | 5 | 1 | 2 | 3 | 4 | 5 |
| Thickness A of photo-polymerized/cured layer containing elastomer [μm] | 47 | 51 | 57 | 44 | 37 | 56 | 58 | 63 | 55 | 52 |
| Thickness B of monomer-absorptive layer [μm] | 30 | 30 | 30 | 30 | 30 | 0 | 0 | 0 | 0 | 0 |
| Thickness A + B (overall thickness) of laminate structure including monomer-absorptive layer and photo-polymerized/cured layer containing elastomer [μm] | 77 | 81 | 87 | 74 | 67 | 56 | 58 | 63 | 55 | 52 |
| Thickness C of elastomer-enriched portion in photo-polymerized/cured layer containing elastomer [μm] | 11 | 15 | 19 | 12 | 9 | 0 | 0 | 0 | 0 | 0 |
| Segregation percentage [%] | 77 | 71 | 67 | 73 | 76 | 100 | 100 | 100 | 100 | 100 |
| Occupancy [%] | 14 | 19 | 22 | 16 | 13 | 0 | 0 | 0 | 0 | 0 |

The articles according to the examples could be produced without evaporation and removal of volatile components such as solvents.

The scanning micrographs of the cross sections of the articles according to the examples demonstrate that the elastomer in the photo-polymerized/cured layer containing the elastomer is unevenly distributed in the layer and enriched in the layer surface or the vicinity thereof. In contrast, the scanning micrographs of the articles according to the comparative examples demonstrate that the elastomer in the photo-polymerized/cured layer containing the elastomer is not unevenly distributed (not concentrated) but spread in the layer.

INDUSTRIAL APPLICABILITY

Viscoelastic articles according to embodiments of the present invention are usable typically in applications where the viscoelastic articles are used as adhesive layers to bond two or more articles composed of different materials from each other; applications where one surface should have flexibility, and the other surface should have hardness; applications where one surface should have adhesiveness, and the other surface should have flexibility; applications where one surface should have hydrophilicity, and the other surface should have hydrophobicity; and applications where one surface should have thermal stability, and the other surface should have thermofusibility (hot-melt properties).

The invention claimed is:

1. A viscoelastic article comprising a multilayer structure including a polymer layer; and a monomer-absorptive layer present on the polymer layer and capable of absorbing at least one of monomer component(s) constituting the polymer, wherein the polymer layer is a polymer layer containing an elastomer, in which the elastomer is unevenly distributed in the layer and enriched at an interface, or in the vicinity thereof, opposite to another interface with the monomer-absorptive layer,
wherein the polymer layer is formed from a polymerizable composition containing the elastomer, and the amount of the elastomer in the polymerizable composition is from 0.001 to 100 parts by weight per 100 parts by weight of the total monomer components constituting the polymerizable composition.

2. The viscoelastic article according to claim 1, wherein the vicinity of the interface opposite to the other interface with the monomer-absorptive layer is an elastomer-enriched portion occupying, in a thickness direction, 50% or less of the total thickness of the polymer layer and the monomer-absorptive layer.

3. The viscoelastic article according to claim 1, wherein the monomer-absorptive layer is a monomer-absorptive polymer layer comprising a polymer.

4. The viscoelastic article according to claim 1, wherein the monomer-absorptive layer is a pressure-sensitive adhesive layer.

5. The viscoelastic article according to claim 1, wherein the polymer constituting the polymer layer containing the unevenly distributed elastomer is an acrylic polymer.

6. The viscoelastic article according to claim 2, wherein the monomer-absorptive layer is a monomer-absorptive polymer layer comprising a polymer.

7. The viscoelastic article according to claim 2, wherein the monomer-absorptive layer is a pressure-sensitive adhesive layer.

8. The viscoelastic article according to claim 2, wherein the polymer constituting the polymer layer containing the unevenly distributed elastomer is an acrylic polymer.

9. The viscoelastic article according to claim 2 wherein average thickness of the elastomer-enriched portion of the polymer layer containing an elastomer, in which the elastomer is unevenly distributed, is from 0.1 to 200 μm.

10. The viscoelastic article according to claim 2 wherein the polymer layer containing an elastomer, in which the elastomer is unevenly distributed, is a polymer layer containing the elastomer and a tackifier resin wherein the elastomer and the tackifier resin are both unevenly distributed in the layer and enriched at an interface, or in the vicinity thereof, opposite to another interface with the monomer-absorptive layer.

* * * * *